Aug. 22, 1967 D. L. MALABY 3,337,766
SELECTIVE BEAM POSITIONING OF A FLYING
SPOT SCANNER WITH ERROR CORRECTION
Filed April 16, 1964 16 Sheets-Sheet 1

INVENTOR.
DAVEY L. MALABY
BY Donald F. Voss
ATTORNEY

OP CODE REG AND CONTROL

Aug. 22, 1967 D. L. MALABY 3,337,766

SELECTIVE BEAM POSITIONING OF A FLYING SPOT SCANNER WITH ERROR CORRECTION

Filed April 16, 1964 16 Sheets-Sheet 3

Aug. 22, 1967 D. L. MALABY 3,337,766
SELECTIVE BEAM POSITIONING OF A FLYING SPOT SCANNER WITH ERROR CORRECTION
Filed April 16, 1964 16 Sheets-Sheet 6
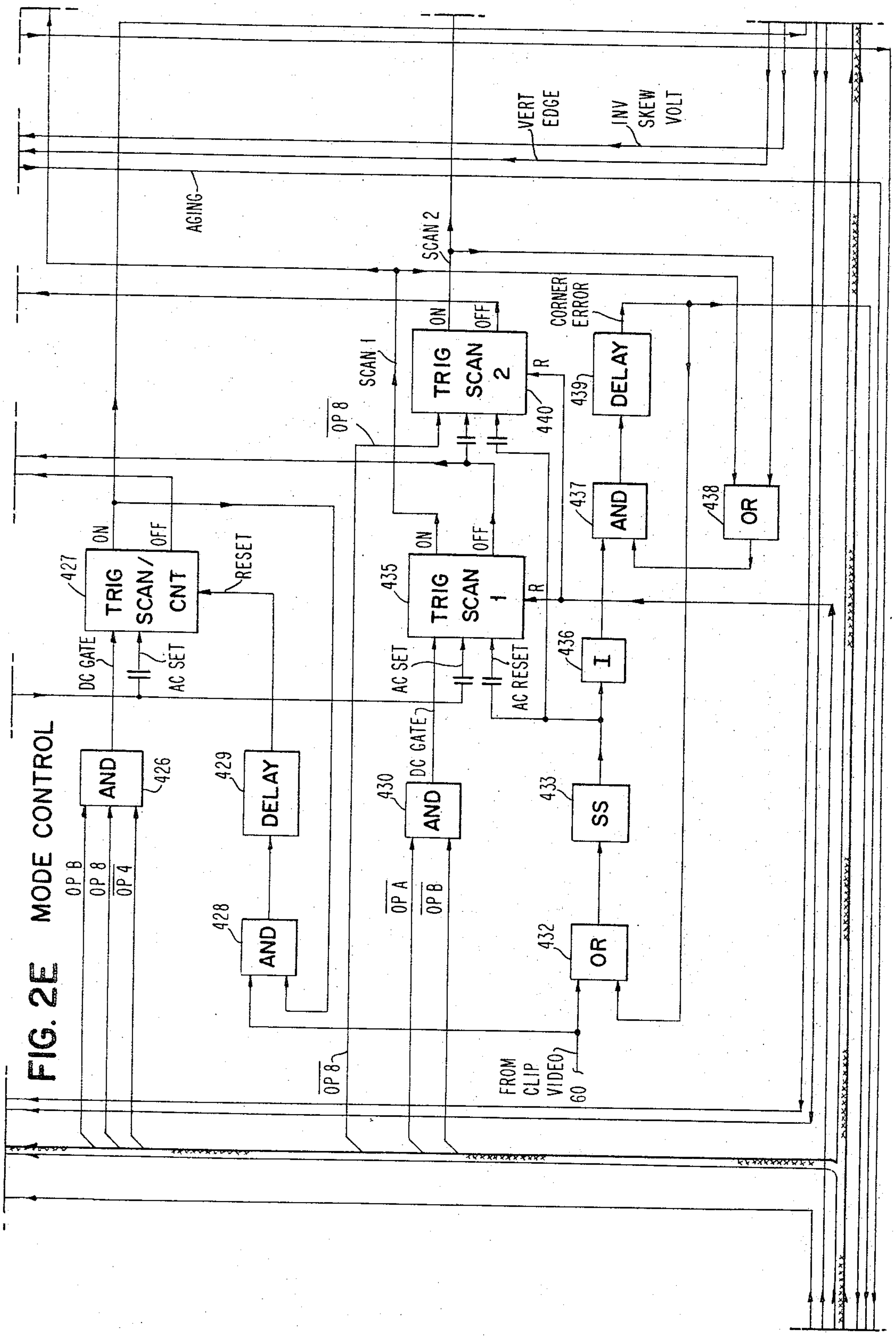
FIG. 2E MODE CONTROL Aug. 22, 1967 D. L. MALABY 3,337,766

SELECTIVE BEAM POSITIONING OF A FLYING SPOT SCANNER WITH ERROR CORRECTION

Filed April 16, 1964 16 Sheets-Sheet 7

BEAM CONTROL

Aug. 22, 1967 D. L. MALABY 3,337,766
SELECTIVE BEAM POSITIONING OF A FLYING SPOT SCANNER WITH ERROR CORRECTION
Filed April 16, 1964 16 Sheets-Sheet 10
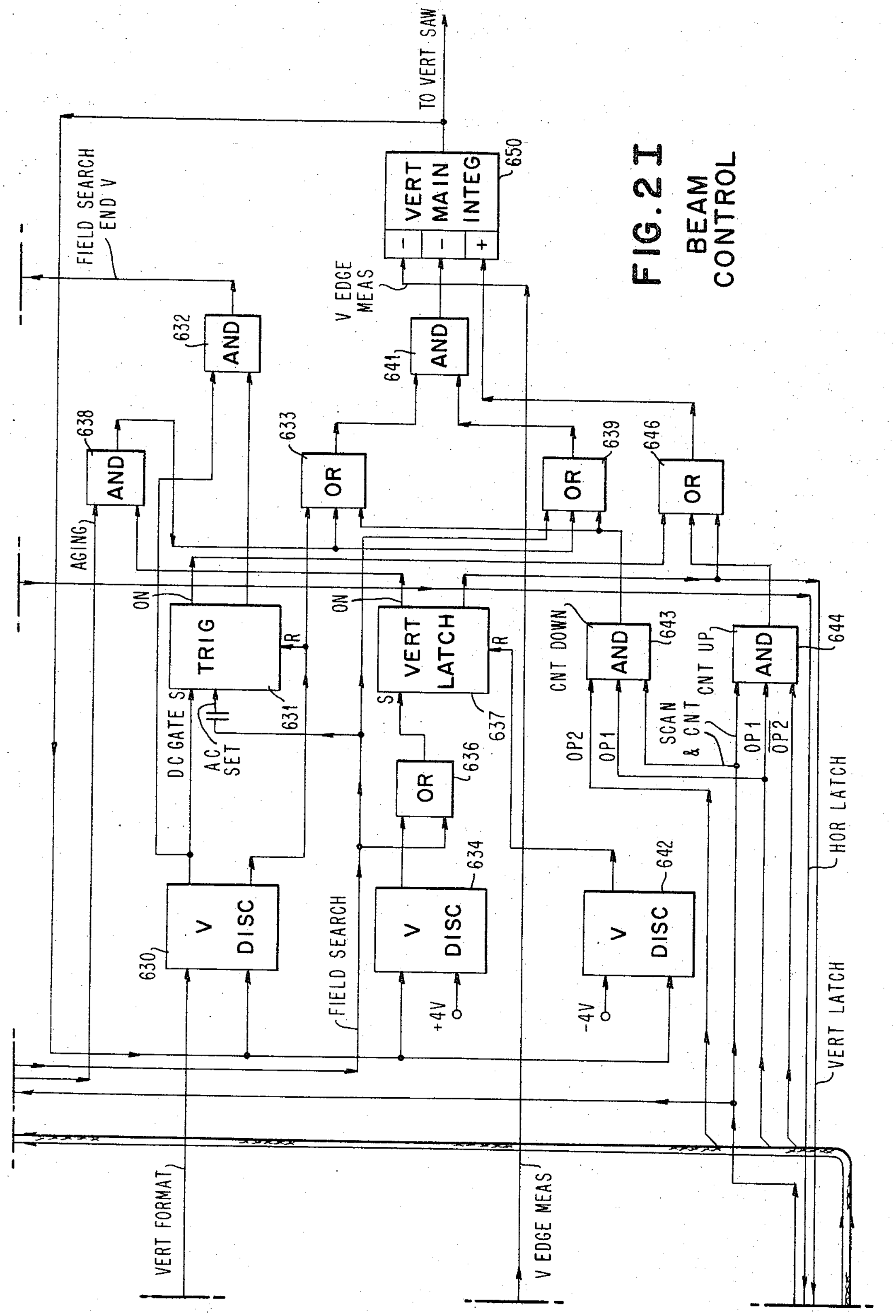
FIG. 2I BEAM CONTROL

VOLTAGE DISCRIMINATOR

FIG. 7

| CORNER MEASUREMENT | VERT. (COARSE) | VERT. (FINE) (INDEX) | HOR. | HOR. (INDEX) | E OF | E OF (INDEX) |
|---|---|---|---|---|---|---|
| UPPER RT. | 31 | | 24 | | 11 | |
| LOWER RT. | 406 | | 24 | | 11 | |
| UPPER LT. | 25 | | 599 | | 11 | |
| UPPER RT. | | 31 | | 24 | | 11 |
| LOWER RT. | | 406 | | 24 | | 11 |
| LOWER LT. | | 414 | | 599 | | 11 |
| FIELD NO. 1 | 85 | | 95 | | 241 | |
| 2 | 95 | | 595 | | 701 | |
| 3 | 155 | | 125 | | 241 | |
| 4 | 367 | | 55 | | 161 | |
| 5 | 367 | | 365 | | 701 | |
| 6 | 392 | | 55 | | 161 | |
| 7 | 392 | | 365 | | 701 | |
| 8 | 417 | 41 | 55 | 55 | 161 | 161 |
| 9 | 417 | 41 | 365 | 365 | 701 | 701 |
| 10 | 442 | 65 | 55 | 55 | 161 | 161 |
| 11 | 442 | 65 | 365 | 365 | 701 | 701 |
| 12 | 467 | 91 | 55 | 55 | 161 | 161 |
| 13 | 467 | 91 | 365 | 365 | 701 | 701 |
| 14 | 492 | 115 | 55 | 55 | 161 | 161 |
| 15 | 492 | 115 | 365 | 365 | 701 | 701 |
| 16 | 592 | 215 | 55 | 55 | 161 | 161 |
| 17 | 644 | 267 | 305 | 305 | 341 | 341 |
| 18 | 644 | 267 | 495 | 495 | 551 | 551 |

COARSE FINE

Aug. 22, 1967

D. L. MALABY 3,337,766

SELECTIVE BEAM POSITIONING OF A FLYING SPOT SCANNER WITH ERROR CORRECTION

Filed April 16, 1964

16 Sheets-Sheet 15

CONTROL WORDS STORAGE LOCATIONS

FIG. 9

SCANNER OPERATION CODES

| FUNCTION | OP CODE CHARACTER | BCD CODE REPRESENTATION |
|---|---|---|
| MEASURE UPPER RIGHT CORNER-NORMAL LENGTH | 1 | $\bar{A}$ $\bar{B}$ $\bar{8}$ $\bar{4}$ $\bar{2}$ 1 |
| MEASURE UPPER RIGHT CORNER-SHORT SPAN | 3 | $\bar{A}$ $\bar{B}$ $\bar{8}$ $\bar{4}$ 2 1 |
| MEASURE LOWER RIGHT CORNER-NORMAL LENGTH | 5 | $\bar{A}$ $\bar{B}$ $\bar{8}$ 4 $\bar{2}$ 1 |
| MEASURE LOWER RIGHT CORNER-SHORT SPAN | 7 | $\bar{A}$ $\bar{B}$ $\bar{8}$ 4 2 1 |
| MEASURE LEFT CORNER- NORMAL LENGTH | 9 | $\bar{A}$ $\bar{B}$ 8 $\bar{4}$ $\bar{2}$ 1 |
| MEASURE LEFT CORNER-SHORT SPAN | # | $\bar{A}$ $\bar{B}$ 8 $\bar{4}$ 2 1 |
| SET UP FOR NEXT SCAN | G | A B $\bar{8}$ 4 2 1 |

FIG. 10 FORMAT INTEGRATOR CONTROL BITS

| FUNCTION | CONTROL BITS |
|---|---|
| START ALL INTEGRATORS | 4, 8 OR @ |
| STOP HORIZONTAL FINE | 1 |
| STOP END OF FIELD (EOF) FINE | 2 |
| STOP HORIZONTAL COARSE | 4 |
| STOP END OF FIELD (EOF) COARSE | 8 |
| STOP VERTICAL FINE | A |
| STOP VERTICAL COARSE | B |

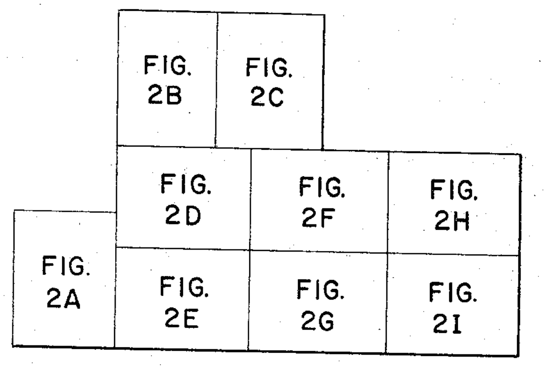

FIG. 11

3,337,766
SELECTIVE BEAM POSITIONING OF A FLYING SPOT SCANNER WITH ERROR CORRECTION

Davey L. Malaby, Rochester, Minn., assignor to International Business Machines Corporation, New York, N.Y., a corporation of New York Filed Apr. 16, 1964, Ser. No. 360,202
21 Claims. (Cl. 315—18)

ABSTRACT OF THE DISCLOSURE

Apparatus is provided for selectively positioning the beam of a flying spot scanner to fields on a document while the document is in reading position in a character recognition machine. To facilitate the selective positioning of the beam to random fields on the document, a control unit provides three types of error measurement control words so as to effectively align the scanner with the document. The error measurement control words include a corner error measurement word, a skew and vertical edge error measurement word and a horizontal edge error measurement word. Each control word includes an operation code character and format integrator control bits. The control words vary in length according to their function.

First, the operation code character entered into a storage register is examined by means of logic circuitry to determine the type of operation to be performed. Error measurements are made by first positioning the beam from a scanner home position to a scanner reference position. This is done by permitting a first set of integrators to operate for certain lengths of time as specified by control bits within the control word from the control unit so as to develop beam deflection voltages. These voltages are stored within the first set of integrators and then transferred to a second set of integrators through the facility of voltage discriminators. The second set of integrators runs until the output voltages therefrom match the voltages of the first set of integrators. The voltages as developed by the second set of integrators are used for deflecting the beam of the scanner. The first set of intergators includes coarse and fine integrators so as to achieve good resolution.

With the scanner beam in the reference position, an error measurement is made under control of the stored operation code character and an end-of-control word condition. These conditions cause logic circuitry to become effective which controls integrators for developing a voltage to deflect the beam from the reference position vertically downward until it engages a pre-printed horizontal mark on the document. The deflection voltage for deflecting the beam to this pre-printed mark is stored in a vertical corner error integrator and in this instance is also driving the deflection circuitry. If no error exists, then the integrator is at zero volts when the beam engages the pre-printed mark. Otherwise, the integrator will be at some voltage either plus or minus, depending upon the type of error. Logic circuitry automatically backs the beam off the horizontal pre-printed mark and deflects the beam to a pre-printed vertical mark. The voltage for deflecting the beam to the pre-printed vertical mark is stored in a horizontal corner integrator which also drives the deflection circuitry and if no error exists, the integrator will be at zero volts. If error does exist, the integrator will be at some plus or minus voltage, depending upon the amount of error. Under logical control, the mode of operation then switches to an aging mode where the beam is deflected in a very coarse raster across the entire face of the scanner so as to uniformly age the same.

The control unit provides a second error measurement word which is used for determining if the document is skewed relative to the scanner coordinate system and for determining if vertical edge error for the document exists. To make these error measurements, control bits within the control word develop deflection voltages for moving the beam to a skew and vertical edge error reference point. These deflection voltages are developed by the first set of integrators and then transferred to the second set of integrators which apply the deflection voltages to deflection circuitry of the scanner. Then, under control of the stored operation code character and an end-of-control word condition, logic circuitry causes the second set of integrators to operate as to first horizontally deflect the beam from the skew and vertical edge error reference point toward a pre-printed vertical mark. A skew integrator, reset to a predetermined voltage, simultaneously stores the voltage corresponding to the voltage required to deflect the beam to the pre-printed vertical mark. If no skew error exists, the integrator should be at zero volts. Logic circuitry automatically backs the beam off the vertical mark and then operates the second set of integrators to drive the beam vertically downward to a pre-printed horizontal mark.

A vertical edge error integrator stores a voltage corresponding to the voltage for driving the beam to the pre-printed horizontal reference mark. If there is no vertical edge error, then the voltage stored is zero. The previously collected vertical and horizontal corner error voltages were applied to the beam deflection circuitry during the time the beam is deflected from the skew and vertical edge error reference point to the vertical and horizontal pre-printed marks.

The third error control word provided by the control unit and logic circuitry causes the beam to first move to a reference position. Thereafter, the beam is driven by the second set of integrators to a pre-printed vertical mark. A horizontal edge error integrator stores a voltage corresponding to the voltage for driving the beam to this pre-printed mark. If there is no horizontal edge error, the voltage stored will be zero. The voltages stored in the skew, vertical edge and horizontal edge error integrators are applied as bias voltages to the first set of integrators when they are used for developing field positioning deflection voltages.

Field search control words furnished by the control uni contain characters for developing beam deflection voltages by means of the first set of integrators. Since these integrators receive bias voltages from the skew, vertical and horizontal edge error integrators and the vertical and horizontal corner error voltages are applied directly to the deflection circuitry, the deflection voltages so developed will accurately position the beam to a selected field location on the document. Additionally, the field position control words contain character bits which identify the length of the field. These character bits develop voltages by means of an end-of-the-field integrator which also stores the voltages so developed. The end-of-the-field voltage is applied to a voltage discriminator when scanning a field for character recognition purposes. The voltage discriminator also monitors the voltage from the horizontal deflection integrator. When the two voltages are equal, as determined by the discriminator, then the end of the field has been reached.

---

This invention relates to apparatus for selectively positioning the beam of a flying spot scanner or cathode ray tube, and more particularly to apparatus for selectively positioning the beam of a flying spot scanner or cathode ray tube incorporated into an optical character or pattern recognition machine, and for providing correction of condition and position errors due to the beam positioning apparatus and the document condition and its relative position to the scanner.

This invention finds particular utility in optical character recognition machines. There is a present trend for optical character recognition machines to be more universal. While the recognition capabilities of optical character recogition machines is steadily being improved, there is a growing need for being able to scan only selected fields of a document. This primarily stems from the requirement for optically reading business documents.

Business documents vary widely not only according to physical properties, but also as to format. It is not unusual for business documents to contain both alphabetic and numeric information which must be read and made available for data processing. Additionally, the alphabetic and numeric information is usually contained in different fields scattered widely about the document. Accordingly, if all areas of the document had to be scanned, including those areas from which no information was to be derived, then the amount of time for scanning any one document would be increased considerably. By being able to selectively position the beam of the scanner only to those fields which contain data to be read, the time for reading a document is then reduced considerably.

Another advantage of the present invention is that many business documents contain information which is not required to be read for data processing. Accordingly, it is necessary to skip over this information. In this invention this is accomplished by merely skipping to the desired fields to be read. Prior art sequential scanning systems require knowledge as to the location of the non-processable information so as to be able to avoid reading the same. This, of course, also requires knowledge of the beam position at all times in order to ascertain when a non-scannable field has been reached.

The selective positioning of the scanner beam to the field on the document containing the information to be processed is not merely a matter of positioning the beam to a selected coordinate position. In actual practice, errors are introduced both by the scanner itself and the condition and relative position of the documents to the scanner. These errors are of such magnitude that correction is necessary. This is particularly true where a field may be a single character in length. If error correction were not provided, the field might be missed entirely. By making error measurements, voltages are developed and fed back into the beam positioning system whereby the beam is correctly positioned.

Scanner errors include the error of the undeflected spot position. Generally, D.C. biasing of the deflection amplifiers reduces this error considerably. The scanner also includes an error due to geometry. This geometric error sometimes is referred to as "pin cushion distortion." This error can be determined mathematically and it does not change from document to document. A calibration chart can be developed to correct for this error. This is also true for any other system errors that do not change from document to document. Another approach is to provide pin cushion correction circuits. This latter approach is not within the scope of the present invention. Other scanner errors which must be considered are deflection coil linearity and residual magnetism.

Another type of error results from any misalignment of the scanner with the document transport. Generally this error can be reduced considerably or held to a minimum by precise methods of alignment.

At this point, it may be summarized that there are some scanner and document transport errors which are compensated for on a static basis, and there are some scanner errors which must be dynamically compensated.

Other errors requiring dynamic compensation or correction are those contributable to the document condition and the document position relative to the scanner. This is primarily due to the fact that each document is a separate entity and therefore the errors are different for each document. Document condition errors are those due to changes in length of the documents as a function of humidity. Another document condition error is that due to format printing. Positional errors of the document are caused by misalignment of the document, sometimes referred to as "skew," and by not precisely stopping the document in the reading position. These errors are corrected for dynamically.

In this invention, each document to be read contains markings for making error measurements. Horizontal and vertical corner measurements are made whereby voltages are developed for effectively bringing the upper right-hand corner of the document into alignment with the home position of the scanner or cathode ray tube. If the document condition were perfect and the document were perfectly aligned at the reading or scanning station, then after this correction is made, the coordinate positions of the scanner or cathode ray tube would be perfectly aligned with the coordinate positions on the document. A second set of pre-printed marks midway along the right side of the document facilitates skew error and vertical edge error measurements. While both horizontal and vertical skew is possible, it is assumed that the amount of skew will be the same for each. Hence, only a single skew measurement is made but correction is made for both horizontal and vertical skew. It should be remembered that skew error is the error caused by the skew of the document and/or the skew of the printed form relative to the scanner beam deflection coordinate system which is fixed by the deflection system of the scanner.

Vertical edge error is the error due to document condition and the beam deflection system. As previously stated, humidity and other like causes can expand or shrink the document. Additionally, the vertical deflection system of the scanner can introduce errors whereby the beam is vertically deflected more or less than a given distance. Although it is necessary to correct for both of these errors, this can be accomplished by a single measurement. The scanner beam is moved from a predetermined starting position until it engages a horizontal mark located at a predetermined horizontal position on the document. If the beam has to travel more or less than a predetermined amount to reach the horizontal mark, then there is error.

A vertical pre-printed mark is contained in the upper left-hand portion of the document for facilitating a horizontal edge error measurement. Horizontal edge error is analogous to vertical edge error. In other words, the width of the document as well as the length can expand or contract and thereby create errors. Also, the horizontal deflection system of the scanner can introduce errors whereby the beam is deflected more or less than a given horizontal distance. Both of these types of errors are considered horizontal edge errors and can be detected by a single measurement, i.e., by moving the beam from a predetermined position until it engages the vertical mark.

The voltages developed by the upper corner measurements which bring the home position of the document into alignment with the home position of the scanner are fed directly into the horizontal and vertical voltage summers of the deflection circuitry. The voltages for skew, horizontal and vertical edge correction are fed to integrators of a digital to analog converter. These error correction voltages are combined within the digital to analog converter with position deflection voltages being developed on a time basis by the integrators. Although these deflection voltages for positionng the beam could be applied directly to the deflection circuits of the scanner, they are stored by beam control circuitry and thereafter applied to the scanner deflection circuitry when operating in a field search mode. This arrangement permits a new field to be selected and stored during the time a previous field is scanned for information. It also permits referencing the beam to the scanner home position without actually having the beam of the scanner trace back to a home position. Hence, the beam of the scanner can move directly from one field to another field. This is very significant because it reduces the positioning time between fields and it enables random aging of the scanner or cathode ray tube.

The selective positioning of the scanner beam is accomplished by a control unit. The control unit essentially provides signals at subsequent predetermined times for turning off integrators of the digital to analog converter which were initially all simultaneously turned on by signals from the control unit. In a preferred embodiment, the control unit takes the form of a digital computer. The digital computer provides variable length control words which indicate the mode of operation, i.e., whether error measurements are to be made or the beam is to be positioned to a selected field and which indicate the length of time the integrators of the digital to analog converter are to be ON. Thus, it is seen that the control word essentially contains an operation code character in an initial position, START data bits for starting all integrators and STOP data bits which are spaced within the control word so as to permit associated integrators to be on for predetermined lengths of time.

Accordingly, it is a principal object of the invention to provide improved apparatus for selectively positioning the beam of a flying spot scanner.

Another object of the invention is to provide improved apparatus for selectively positioning the beam of a flying spot scanner which first makes error measurements in terms of error voltages which are fed into the beam deflection system to provide corrected positioning of the beam to predetermined selected coordinate positions.

Still another very important object of the invention is to provide apparatus for selectively positioning the beam of a flying spot scanner which enables random aging of the scanner.

Yet another important object of the invention is to provide apparatus for selectively positioning the beam of a flying spot scanner which stores the voltages for deflecting the beam to a selected field to enable the setting up of the deflection voltages during the time that the beam is scanning characters of a field for information purposes.

Another object of the invention is to provide apparatus for selectively positioning the beam of a flying spot scanner where the deflection voltages for deflecting the beam to the selected position are developed on a digital time basis.

A more specific object of the invention is to provide apparatus for selectively positioning the beam of a flying spot scanner where the deflection voltages for deflecting the beam to the selected position are developed by a digital to analog converter under control of variable length words contained within data storage apparatus.

Still another specific object of the invention is to provide apparatus for selectively positioning the beam of a flying spot scanner incorporated into a character recognition machine where the voltages for deflecting the beam to predetermined document field positions are corrected for each document to be read.

The foregoing and other objects, features and advantages of the invention will be apparent from the following more particular description of a prferred embodiment of the invention, as illustrated in the accompanying drawings.

In the drawings:

FIG. 1 is a schematic block diagram of the invention;

FIGS. 2*a*, 2*b*, etc. taken together as shown in FIG. 11, form a schematic logic diagram for the block diagram shown in FIG. 1;

FIG. 7 is a table of coordinate positions of the preprinted marks and fields of data on the document in FIG. 6;

FIG. 9 is a table identifying the scanner operation codes;

FIG. 10 is a table listing the format integrator control bits; and

FIG. 11 is a block diagram illustrating how the FIGS. 2*a*, 2*b*, etc. should be taken together.

*General*

Figure 1:
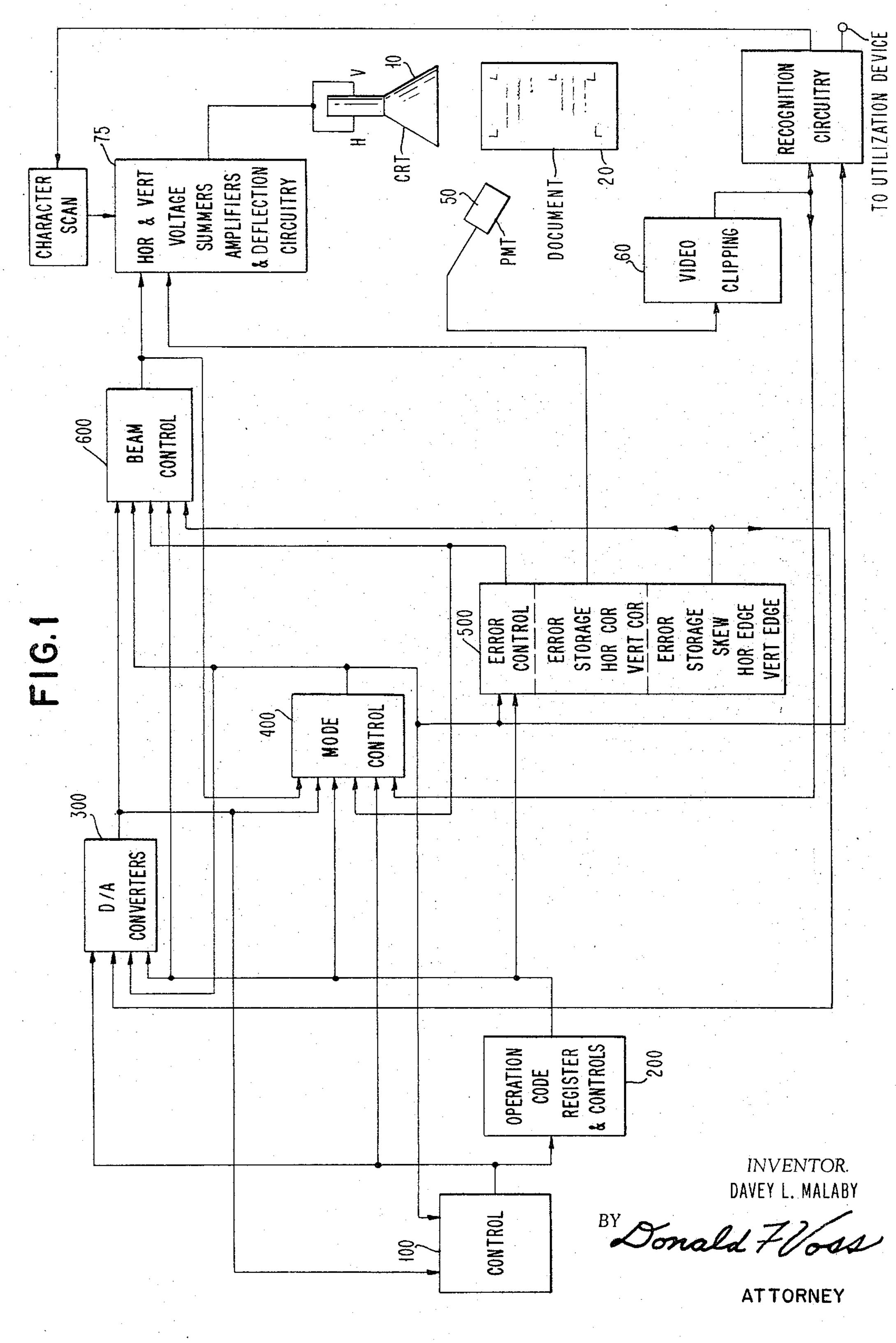
Figure 2A:
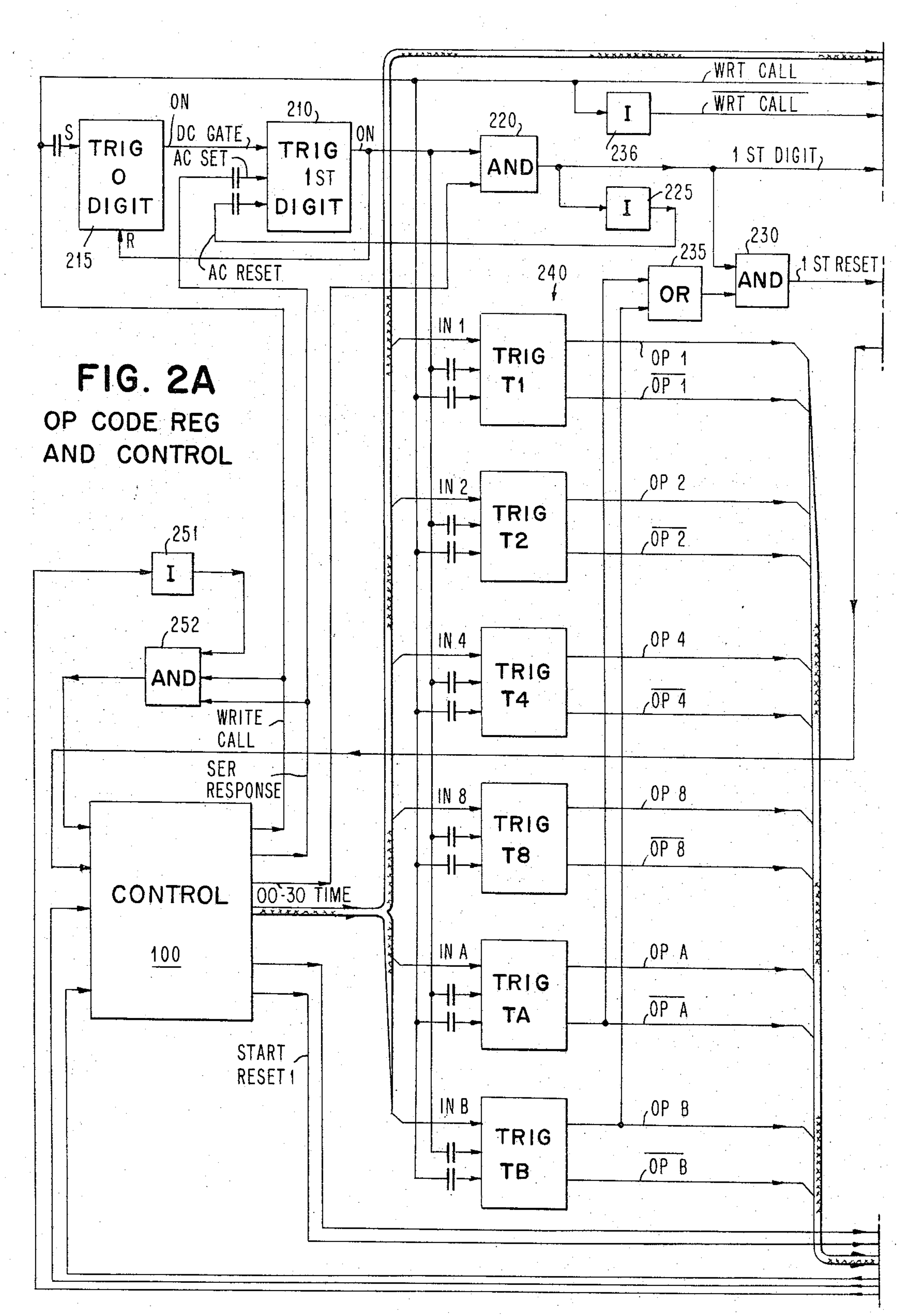
Figure 2B:
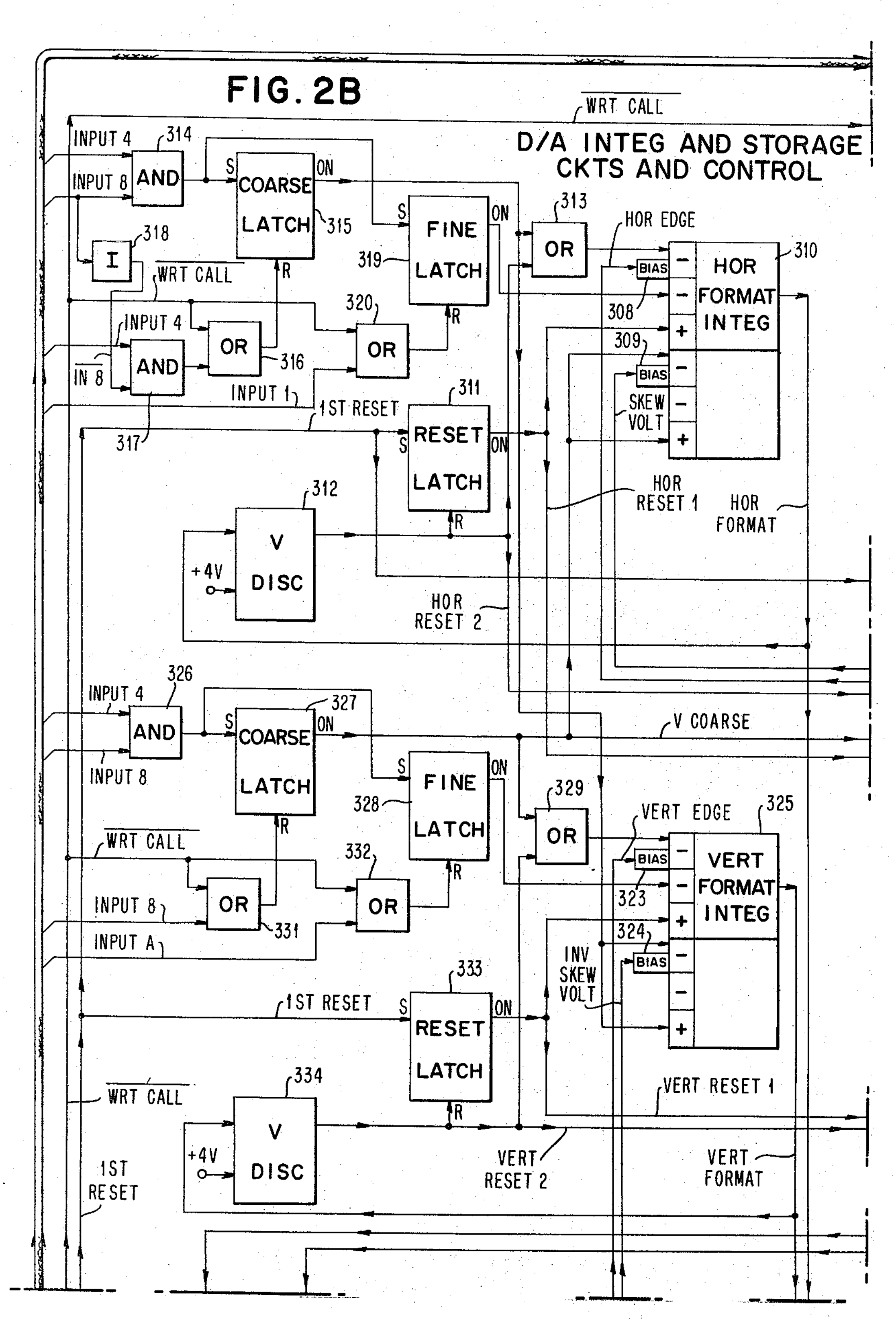
Figure 2C:
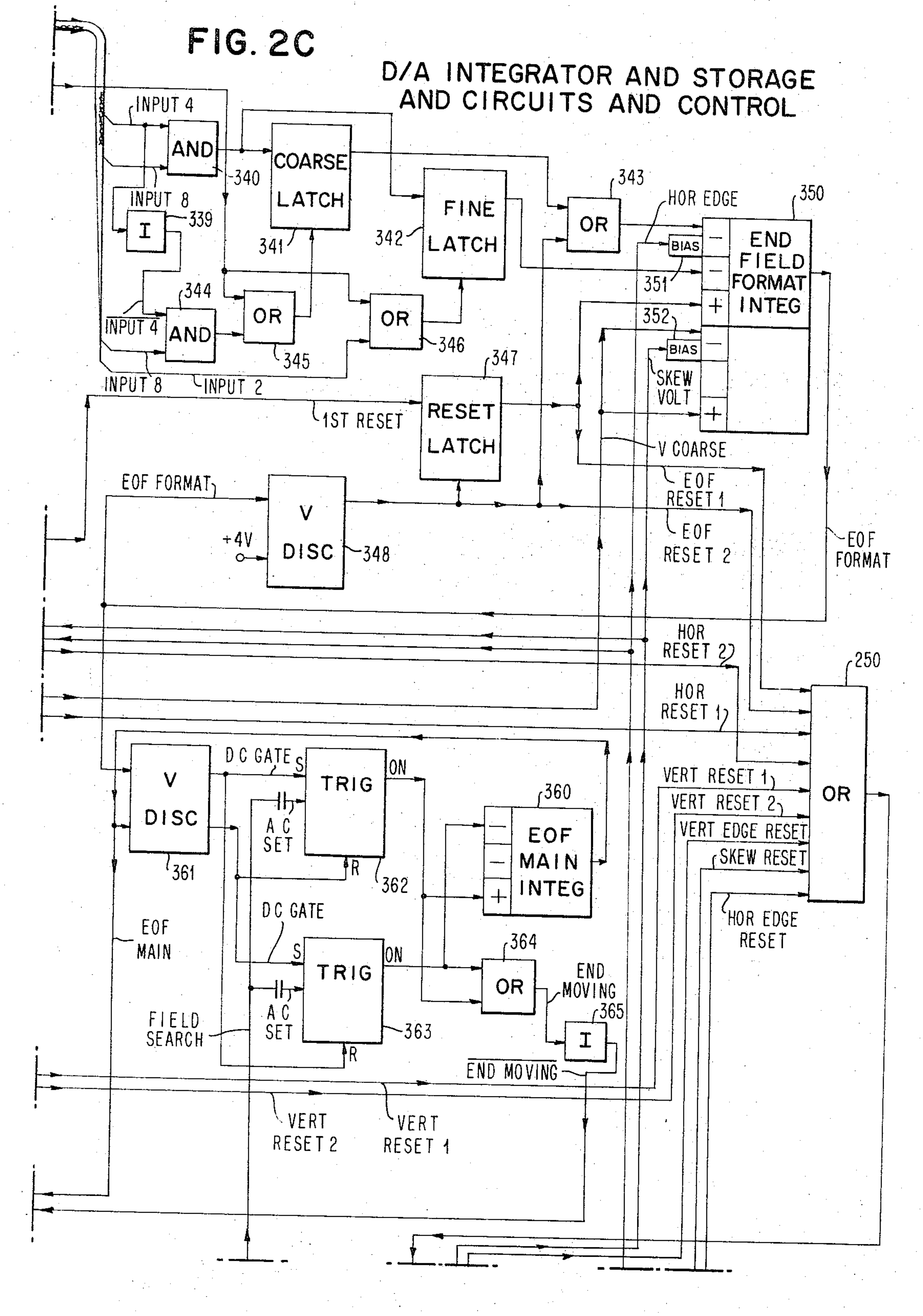
Figure 2D:
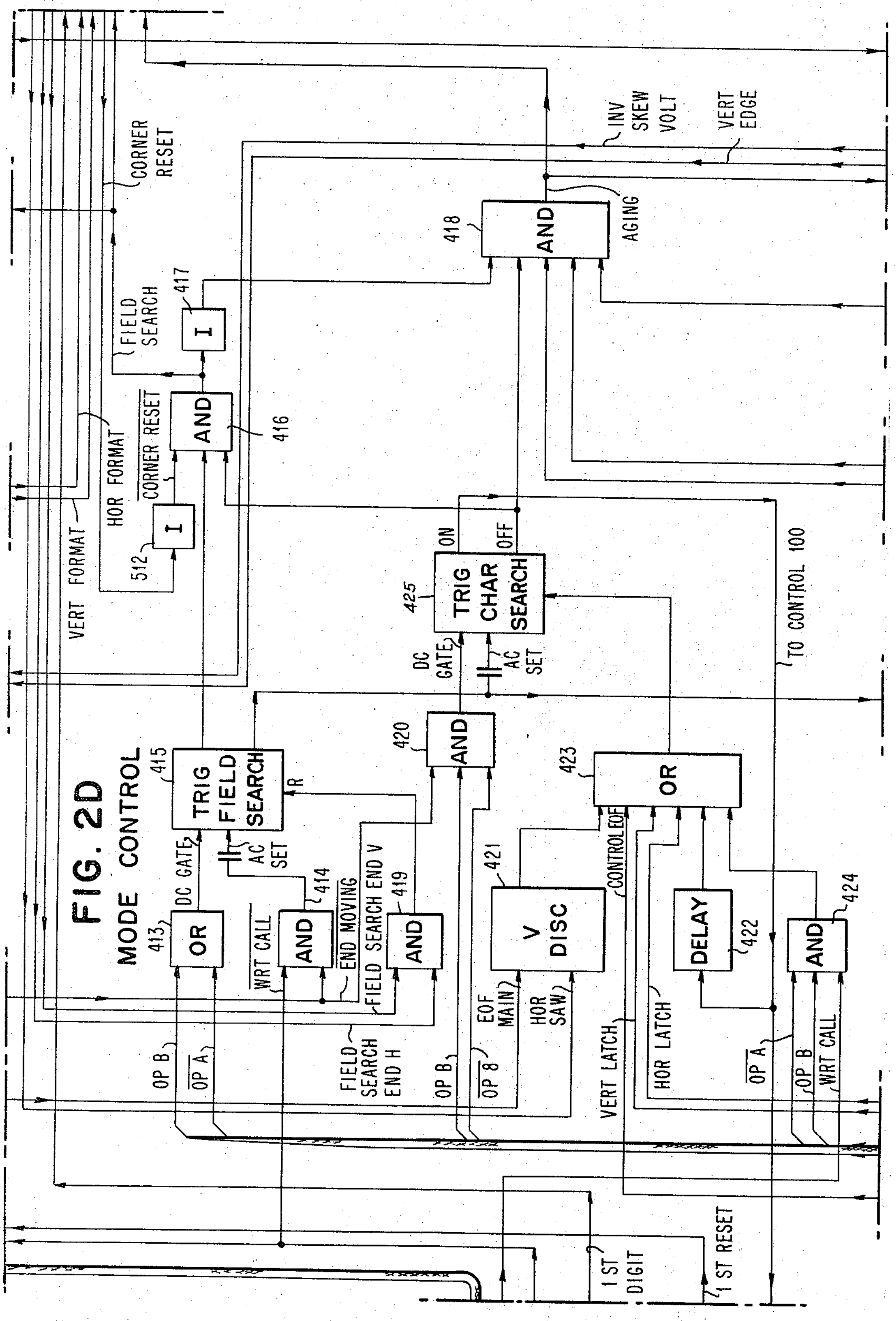
Figure 2F:
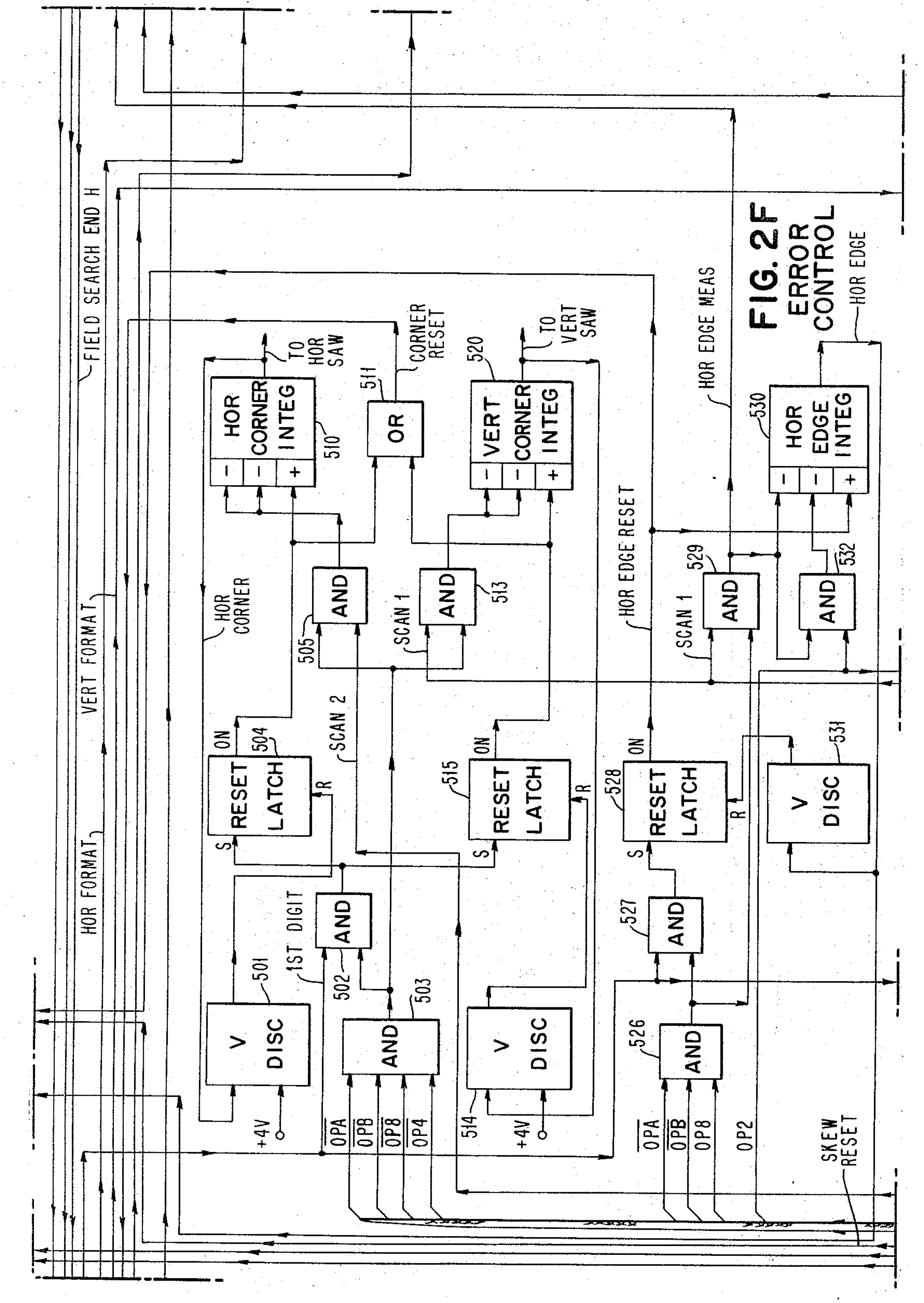
Figure 2G:
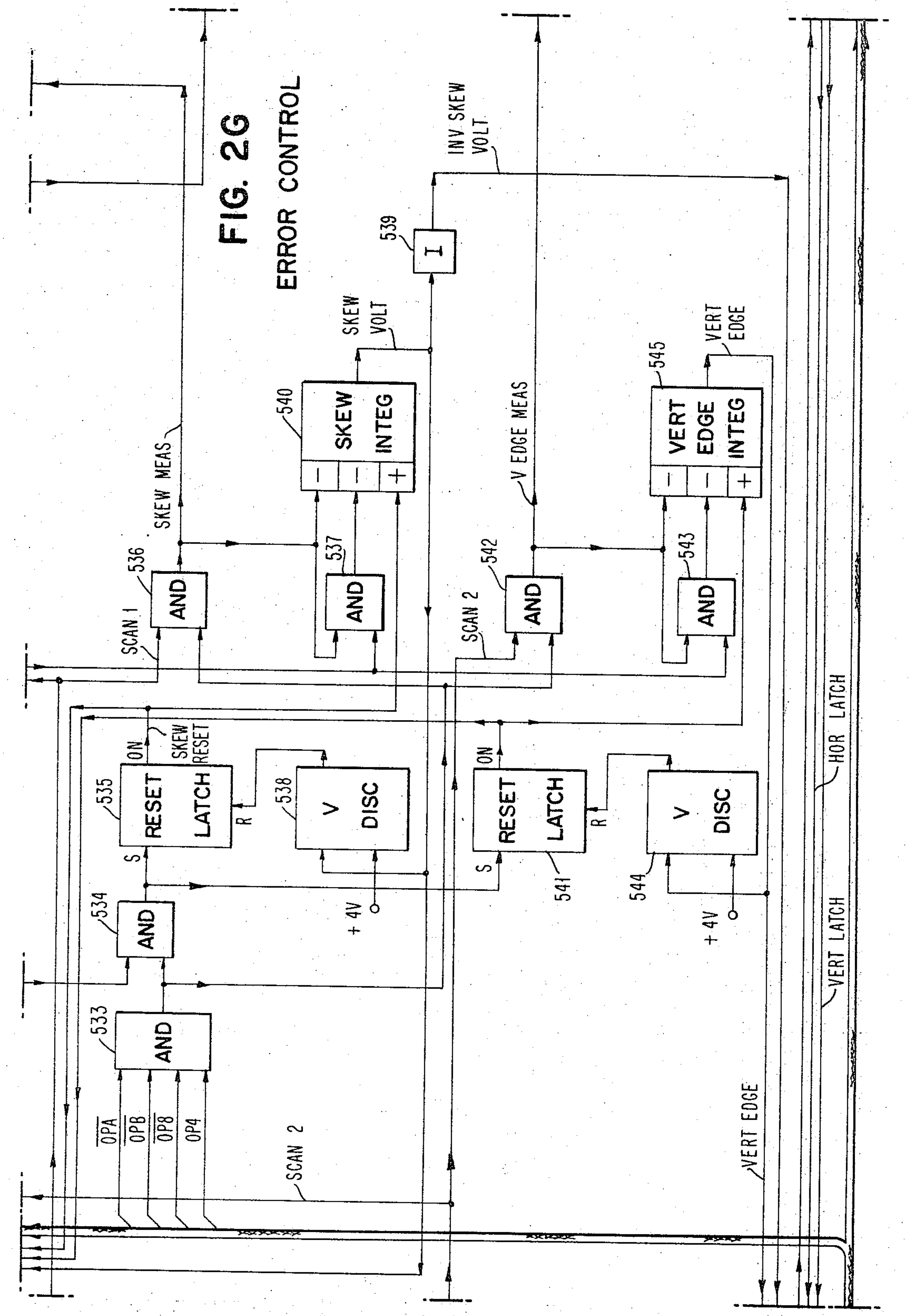
Figure 2H:
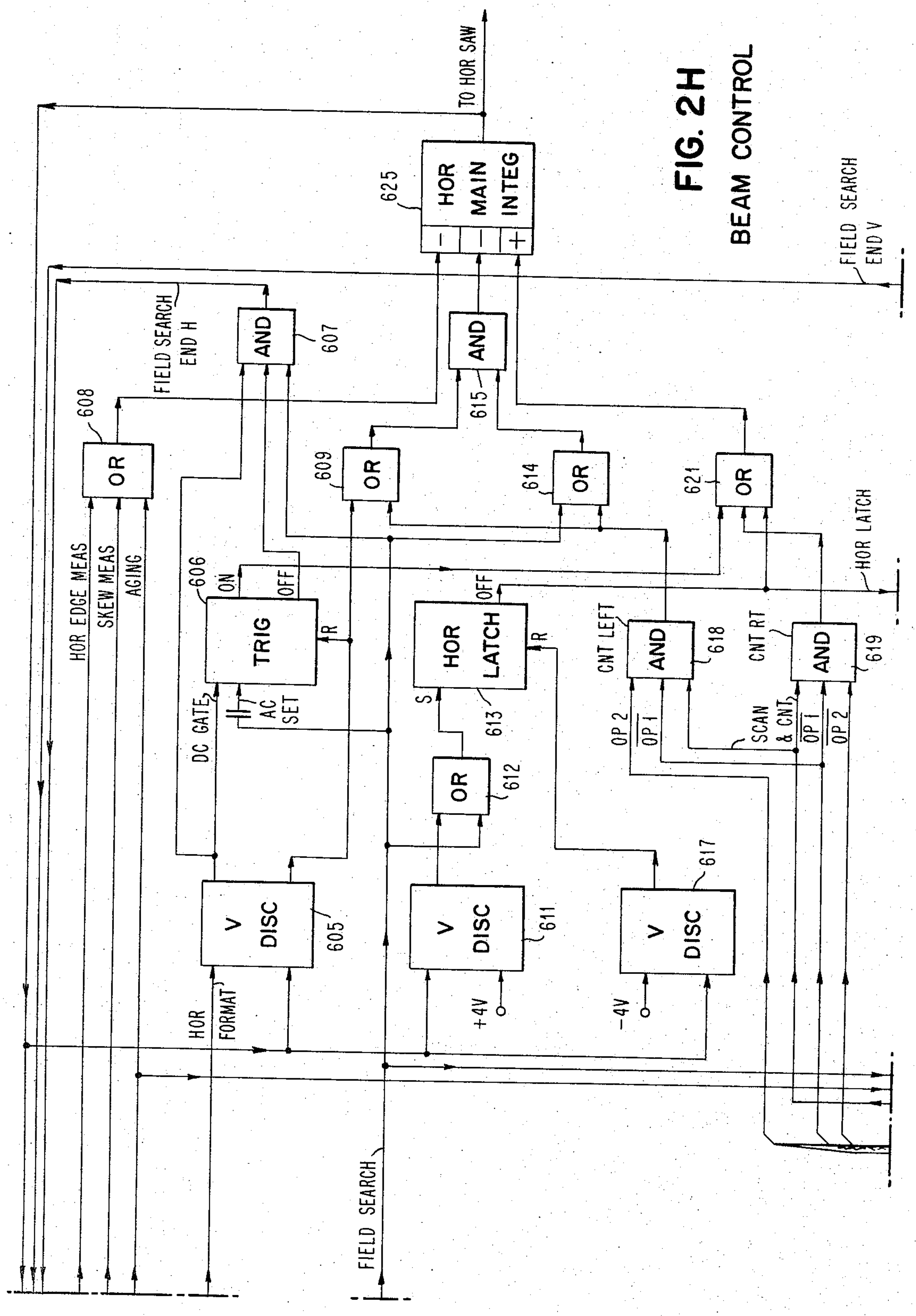
Figure 6:
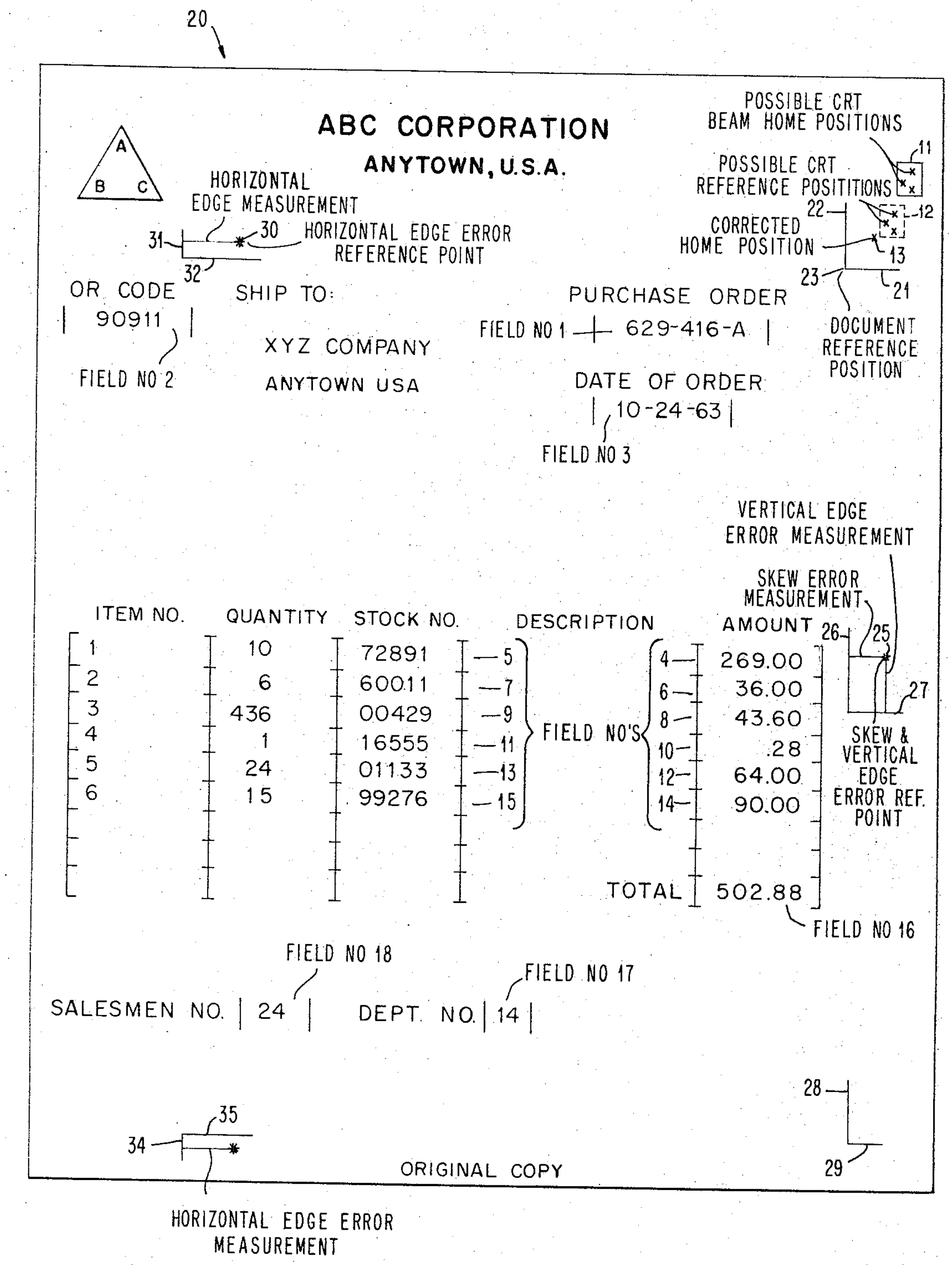
FIG. 6 is a schematic illustration of a typical business document having pre-printed marks thereon for facilitating error measurements and having eighteen scannable fields of data.

This invention is concerned with the selective positioning of the beam of the cathode ray tube 10, FIG. 1, to predetermine data fields on document 20 shown in FIGS. 1 and 6. The reading and recognition of characters within the data fields on document 20 does not form a part of this invention. Also the apparatus for transporting the documents into and out of the reading position does not form a part of the invention and therefore, it is not shown.

The invention will be best understood by referring to document 20 which is shown in detail in FIG. 6. Document 20 is illustrated as a typical business document having eighteen fields of scannable data and pre-printed marks for facilitating error measurements to be made. The beam of the cathode ray tube 10 will have a home position which it will be assumed can be anywhere within box 11 shown in FIG. 6. For purposes of example, several possible beam home positions are shown; however, the beam will have only one of these home positions. All coordinate positions on the face of the cathode ray tube 10 are referenced to the home position.

In this invention, the coordinate positions on document 20 are aligned with the coordinate positions on the face of the cathode ray tube 10. This, in essence, is accomplished by aligning the home position of the document with the home position of the cathode ray tube. This is accomplished by first deflecting the beam of the cathode ray tube 10 from its home position a given amount in vertical and horizontal directions whereby the beam is positioned to a cathode ray tube reference position within dotted box 12. Since several possible cathode ray tube beam home positions were shown within box 11, a corresponding number of cathode ray tube reference positions are shown within box 12.

The beam is then deflected respectively in vertical and horizontal directions until it respectively engages horizontal and vertical reference lines 21 and 22. The reference lines 21 and 22 intersect at a point 23 identified as the document reference position. The amount of voltage required to deflect the beam from the cathode ray tube reference position to lines 21 and 22 respectively will deflect the beam from the cathode ray tube home position to a corrected home position 13, which will then be at the given vertical and horizontal distance away from the document reference position 23. This effectively aligns the home position of the document to the home position of the beam. The coordinate positions on the face of the cathode ray tube would now be in registration with the coordinate positions of the document as referenced to the home position, if certain other errors did not exist.

One of the other types of errors possible is skew error. In this example, only the amount of skew of the right-hand edge of the document is determined. This is defined as vertical skew. It is assumed that misalignment of the upper or lower edge of the document or horizontal skew is substantially the same as but opposite in sense to the misalignment of the right and left edges of the document or vertical skew. Hence, only one measurement is necessary; however, a correction is made for both horizontal and vertical skew.

Vertical skew error measurements are made with respect to each document. The skew error is detected by the amount of voltage necessary to deflect the beam from the skew and vertical edge error reference point 25 in a horizontal direction until it engages reference line 26. The skew and vertical edge error reference point 25 is a point related to the coordinate system of the cathode ray tube and, therefore, if there is no skew, then the beam moves in a horizontal direction a predetermined distance before engaging the reference line 26. However, if the document is skewed, then the beam will either move a lesser or greater distance than the predetermined distance before engaging reference line 26. It should be recognized that skew error is the error caused by the skew of the document and/or the skew of the pre-printed form lines on the document relative to the beam deflection coordinate system which is fixed.

Vertical edge error is the error due to document condition and the beam deflection system for deflecting the beam in a vertical direction. Humidity and other like causes can expand or contract the document. Hence, a point on the document would not always be a given vertical distance away from the corrected home position. Additionally, the vertical deflection system of the cathode ray tube can introduce errors whereby the beam is deflected more or less than a given distance. Both types of errors can be corrected by a single measurement. This measurement is made by moving the beam from the skew and vertical edge reference point 25 in a vertical direction until it engages reference line 27. If the beam has to move more or less than the predetermined distance from reference point 25 before engaging line 27, then there is vertical edge error. It should be pointed out at this time that reference lines 26 and 27 can be used in a manner similar to reference lines 21 and 22 to develop a corrected home position if it is necessary for the document to be indexed in order for the cathode ray tube 10 to scan the entire document. Under this latter condition, the reference lines 28 and 29 would be used to facilitate the skew error and the vertical edge error measurements.

Horizontal edge error is directly analogous to vertical edge error and it is measured by moving the beam to the horizontal edge error reference point 30 and then measuring the amount of voltage required to deflect the beam from point 30 in a horizontal direction to engage reference line 31. The amount of horizontal edge error, if any, is determined by the amount this voltage differs from a predetermined voltage. Pre-printed reference line 32 cannot directly facilitate error measurements; however, it aids in defining an area in cooperation with reference line 31 which must be free of any printing so that the horizontal edge error measurement can be made. If, as previously stated, it is necessary to index the document in order to scan the same, then reference lines 34 and 35 are used for making the horizontal edge error measurement.

It is thus seen that there are two types of dynamic measurements made for detecting two distinct types of errors so as to provide correction voltages. One type of correction voltage references the beam of the cathode ray tube to the document, and this correction voltage is fed directly into the horizontal and vertical voltage summers, amplifiers, and deflection circuitry schematically represented by block 75 in FIG. 1. This type of correction voltage is derived from the voltages necessary to locate the cathode ray tube beam from its home position to the corrected home position 13. The other types of correction voltages are those which are a function of the beam from its home position, in other words, skew, vertical edge, and horizontal edge error voltages. These error voltages are entered into the digital to analog converter circuitry as represented by block 300, FIG. 1.

After the error measurements are made, the beam is selectively positioned to the first field of data desired to be read. This invention permits many fields of data to be read in any order desired.

In this particular example, there are eighteen fields of data to be read from document 20. The fields of data can be read in any desired order because this invention enables selective positioning of the cathode ray tube beam to any position on the document. Positioning of the beam for making error measurements and for positioning the beam to any field on the document is under control of control unit 100, FIG. 1. Control unit 100 provides signals for indicating the type of operation to take place, i.e., error measurement and field positioning operations. Control unit 100 also provides variable time bases which are converted by the digital to analog converter circuitry 300 into deflection voltages. It should be noted that the control unit 100 does not merely supply a digital number which is converted into an analog deflection voltage rather it provides variable length times which are converted to analog deflection voltages. These deflection voltages are corrected and stored, and then subsequently supplied to the cathode ray tube deflection system. This arrangement permits the next field to be set up while the cathode ray tube is scanning a previously set up field for information in a scan mode. Hence, after the cathode ray tube has scanned a field of data for information, is is switched to a field search mode whereby the voltages for deflecting the beam to the new field, set up during the time the beam was scanning the previous field, are applied to the cathode ray tube deflection system.

Figure 8:
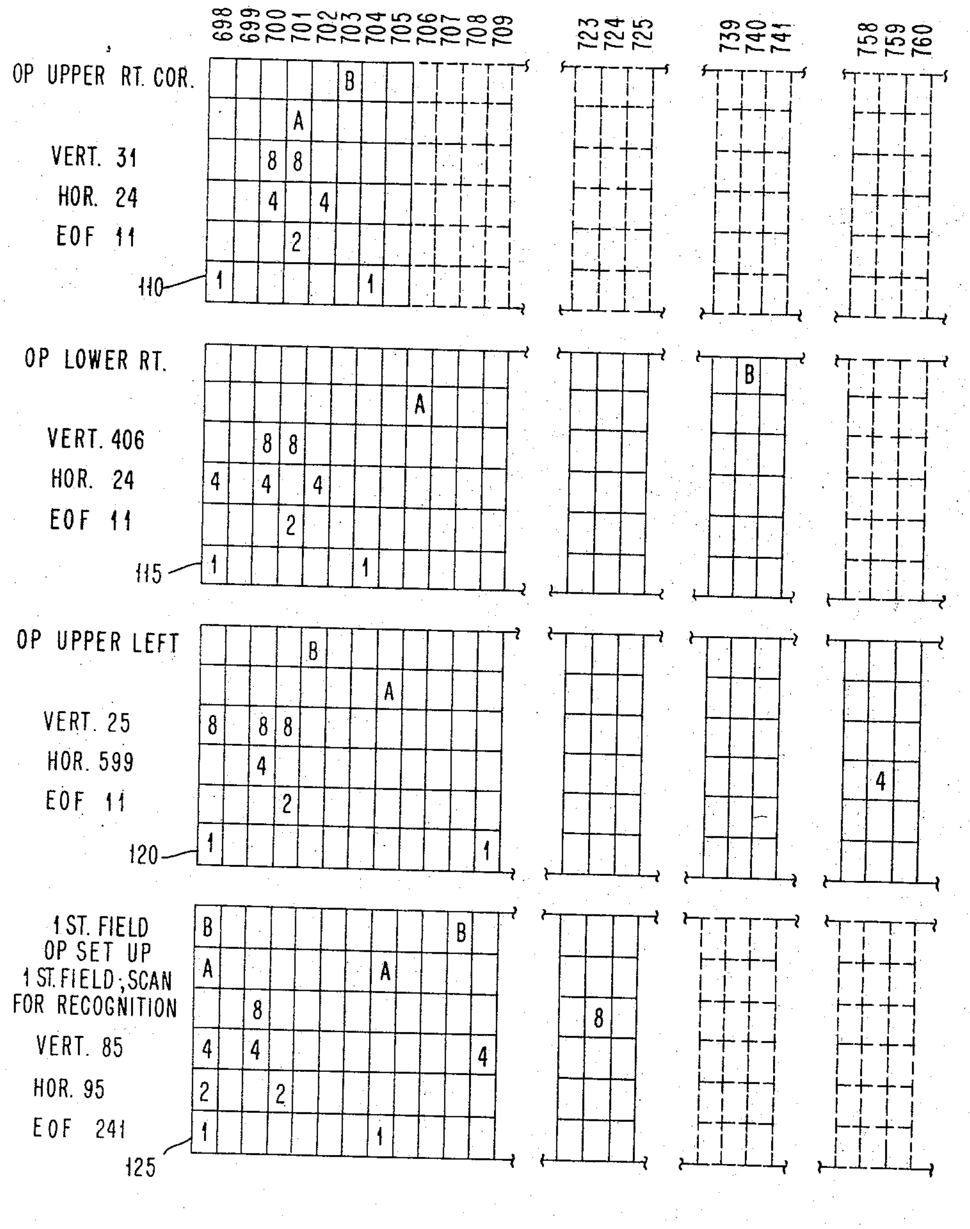
FIG. 8 is a diagram showing three control words for facilitating error measurements in connection with the document shown in FIG. 6 and a fourth control word to facilitate the selective positioning of the beam to the first field thereon.

In this particular example, it is intended that the control unit 100 take the form of the IBM 1401 Data Processing System shown and described in the IBM Customer Engineering Reference Manual, Form No. 225–6487–3, Copyrights 1960, 1961, 1962 and 1963, by International Business Machines Corporation, 590 Madison Avenue, New York, New York, copies of which may be found in the Library of Congress. The 1401 Data Processing System is a variable word length system and each character time is 11.5 microseconds. Control words for performing the error measurements and for seeking the desired fields of data are stored in the storage unit of the 1401 Data Processing System. The control words are assembled via an index register and formed in the storage unit of the 1401 Data Processing System. In this example, the control word starts with storage position 698, FIG. 8, and ends at storage position 798; however, each control word varies in length. Although the control word can be of any length, they generally have a maximum length of 100 characters. The control words for effecting error measurements and field positioning in this particular example are shown in FIG. 8. The first character of a control word is the operation code character and it identifies the type of operation to take place. The various scanner operation code characters are shown in FIG. 9. The remaining characters or bits within the control word are format control bits as shown in FIG. 10. These bits occupy character storage positions and the bits are meaningful according to functions set forth in FIG. 10. The first format control character made up of a combination of control bits 4 and 8 or the character @ always starts all integrators of the digital to analog converter. The remaining characters within the control word are control bits spaced from each other on a character basis to provide stop signals to the integrators of the digital to analog converters and thereby provide variable length time bases for the integrators in the digital to analog converter circuitry 300.

The deflection voltage developed by the digital to analog conversion circuitry 300 is based upon the following equation:

$$Vd=\frac{IT}{C}$$

where $Vd$=deflection voltage
$I$=integrator current
$T$=amount of time an integrator is turned on
$C$=storage capacitance Almost any desired resolution can be obtained. In this example, where the character time is 11.5 microseconds, a control word of 100 characters can obtain a .010 inch resolution across a horizontal scan of ten inches. This is accomplished by using a coarse integrator, which, when ON, develops a voltage for deflecting the beam a distance of 100 mils for each 11.5 microseconds and a fine integrator which, for each character time, develops a voltage for deflecting the beam 10 mils. Of course, the resolution can be changed by changing the integrators.

In this particular example, all integrators of the digital to analog converter 300 are ON for at least one character time, or 11.5 microseconds. Thereafter, the integrators are turned OFF in accordance with the location of the control bits within the control word. For example, with reference to FIG. 8, the control word 110 for carrying out an error measurement in connection with the cathode ray tube beam home position has an operation code character 1 in character storage position 698. It is seen in FIG. 9 that the operation code character 1 designates a measurement of the upper right corner-normal length.

With reference to FIG. 2, at the beginning of a control word, the control unit 100 issues a WRT CALL signal which is applied to the set terminal of zero digit trigger 215. The WRT CALL signal is present for the entire control word and it is used to reset the operation code register 240. The D.C. gates of triggers T1, T2, T4, T8, TA and TB which form operation code register 240, are connected to corresponding bit lines of the control unit 100. The A.C. reset terminals of these triggers are connected to control unit 100 to receive the WRT CALL signal therefrom. Hence, these triggers are initially reset before receiving a character from control unit 100. The A.C. set terminals of these triggers are connected to the ON output of a first digit trigger 210. The first digit trigger 210 has its D.C. gate terminal connected to the ON output of the zero digit trigger 215. The A.C. set terminal of trigger 210 is connected to control unit 100 for receiving a SERVICE RESPONSE signal. Hence, only after the triggers forming register 240 have been reset and after a SERVICE RESPONSE signal is issued from control unit 100 will the operation code character be set into register 240.

With the operation code character in register 240, no other character within the control word can enter register 240. The operation code character within control register 240 will not be utilized for mode control until the WRT CALL signal has been terminated. It will be used during character 699 time for facilitating the resetting of integrators 510, 520, 530, 540 and 545 depending upon the operation code character. However, during the time that the WRT CALL signal is present, the integrators of the digital to analog conversion circuitry 300 will be turned on by the bits 4 and 8 in storage position 700, FIG. 8. Storage position 699 is blank to permit time for resetting the integrators. Thereafter, the integrators of the digital to analog conversion circuitry 300 will be turned OFF as format integrator control bits are encountered within the control word. The bits for controlling the fine and coarse vertical integrators of integrator 325 are stored in positions 701 and 703 respectively. Hence, the fine and coarse vertical integrators will be ON for a period of time to develop a deflection voltage for vertically deflecting the beam 310 mils. As it will be recalled, this voltage is stored, transferred to a vertical main integrator 650 and then fed directly into the horizontal and vertical voltage summers, amplifiers and deflection circuitry 75 of FIG. 1. The format integrator control bits for controlling the fine and coarse horizontal integrators of integrator 310 are located in the storage positions 704 and 702 respectively. Thus, the horizontal fine and coarse integrators will develop a deflection voltage for deflecting the beam horizontally 240 mils. This horizontal deflection voltage is stored by integrator 310 and a horizontal main integrator 625 is caused to match the voltage of integrator 310. The voltage of integrator 625 is then fed to the circuitry 75 for deflecting the beam. With this particular control word, the fine and coarse end of field integrators of integrator 350 are turned OFF simultaneously and the bits for controlling these integrators are located in storage position 701. The end of a field is rather meaningless when operating to make error measurements. But, since all integrators of the digital to analog converter circuitry 300 are initially turned ON, it is necessary to turn the end of field integrators OFF and this should be done as soon as possible. Hence, the control bits are placed in storage position 701. The end of field integrators of integrator 350 provide a barrier voltage or end of field voltage limit which is stored, transferred to an end of field main integrator 360 and used as a basis for determining when to switch out of a character search mode. This will be described later herein.

When the control unit 100 takes the form of an IBM 1401 Data Processing System, a group mark word mark set up in storage by the programmer indicates the end of a control word and upon detecting this mark, the WRT CALL signal is terminated. When the WRT CALL signal is terminated, the operation is automatically switched to a field search mode. With reference to FIG. 2, a field search trigger 415 has its D.C. gate connected to the output of a logical OR circuit 413 which has one input connected to the ON output of trigger TB and another input connected to the OFF output of trigger TA of register 240. The A.C. set terminal of trigger 415 is connected to the output of a logical AND circuit 414 which has an input connected to the output of an inverter 236. When the inverter 236 is not conducting, this is indicative of a $\overline{\text{WRT CALL}}$ condition. Logical AND circuit 414 also has an input connected to the output of an inverter 365. Inverter 365 when not conducting is indicative that the end of field voltage developed by the end of field format integrator 350 has been transferred to the end of field main storage integrator 360.

Since there is not a character A in register 240, the D.C. gate of trigger 415 will be conditioned via logical OR circuit 413 whereby the trigger 415 will be SET at the end of the $\overline{\text{WRT CALL}}$ signal. The inverter 365 will not be conducting at this time and therefore the other input to logical AND circuit 419 will be satisfied. When the field search trigger 415 is set ON, this essentially indicates that the beam could be moved to the position set up by the voltages stored in the horizontal and vertical integrators 310 and 325. However, the beam should not be in a character search mode until the end of field barrier has been SET in the integrator 360. Hence, the ON output of trigger 415 and the OFF output of character search trigger 425 are connected as inputs to a logical AND circuit 416. Logical AND circuit 416 also has an input connected to the output of an inverter 512 which provides an indication that the horizontal and vertical corner integrators 510 and 520 are not being reset. The setting of trigger 415 then permits the voltages in integrators 310 and 325 to be transferred to integrators 625 and 650, respectively, of the beam control circuit 600 if these other input conditions to logical AND circuit 416 are met. The integrators 625 and 650 have their outputs connected to the deflection circuitry 75, FIG. 1. The transfer of the voltages from integrators 310 and 325 to integrators 625 and 650, respectively, is accomplished by permitting integrators 625 and 650 to develop voltages until they match the voltages stored by integrators 310 and 325 respectively. The voltages so developed by the integrators 625 and 650 then cause the beam to be deflected to the position determined thereby.

The output of logical AND circuit 416 is used for two primary purposes. One purpose is to permit the voltages stored in integrators 310, 325 and 350 to cause an equal voltage to be developed in integrators 625, 650 and 360 respectively only if the character search trigger 425 is OFF and the inverter 512 is not conducting. The other purpose is to provide an indication to logical AND circuit 418 that the inputs to logical AND circuit 416 have not been satisfied. This latter purpose is accomplished in view of the fact the output of logical AND circuit 416 is connected to the input of an inverter 417 the same having its output connected to an input of logical AND circuit 418. Logical AND circuit 418 has other inputs which will be described later herein. However, at this time, it is sufficient to note that when there is a signal appearing at the output of logical AND circuit 418, the beam is placed in an aging mode.

In connection with the matching of the voltage of the horizontal main integrator 625 to the voltage of the horizontal format integrator 310, the output of logical AND circuit 416 is connected to the A.C. set terminal of a trigger 606, to the input of logical OR circuits 612 and 614 and to an input of a logical AND circuit 607. The D.C. gate of trigger 606 is connected to an output of voltage discriminator 605 which has an input connected to the output of the horizontal main integrator 625 and an input connected to the output of the horizontal format inegrator 310. The voltage discriminator 605 also has an output connected to the reset terminal of trigger 606 and to the input of a logical OR circuit 609. The voltage discriminator 605 will have an output to the D.C. gate of trigger 606 when the voltage of the horizontal main integrator 625 is more negative than the voltage of the horizontal format integrator 310. Hence, when the inputs to logical AND circuit 416 are satisfied, the trigger 606 will be SET, if integrator 625 is more negative than integrator 310 and the horizontal main integrator 625 would develop a positive going voltage. When the voltage of the horizontal main integrator becomes more positive than the voltage of the horizontal format integrator 310, then there is an output from voltage discriminator 605 to reset trigger 606. Therefore, there is an output from logical OR circuit 609 to logical AND circuit 615 which has an input connected to the output of logical OR circuit 609 and also has an input connected to the output of logical OR circuit 614. It will be recalled that logical OR circuit 614 also has an input connected to the output of logical AND circuit 416. Hence, the inputs to logical AND circuit 615 will be satisfied at this time.

The output of logical AND circuit 615 is connected to horizontal main integrator 625 to cause it to develop a negative voltage. The horizontal main integrator 625 then develops a negative voltage whereby when it matches the voltage of the horizontal format integrator 310, the voltage discriminator 605 again provides an output signal to trigger 606. However, trigger 606 cannot be SET at this time because the conditions to logical AND circuit 416 have already been satisfied and therefore, there will be no A.C. signal for setting the trigger 606. The output from voltage discriminator 605 which is connected to the D.C. gate of trigger 606 is also connected to an input of a logical AND circuit 607. Logical AND circuit 607 also has an input connected to the OFF output of trigger 606 and an input connected to the output of logical AND circuit 416. It is thus seen that logical AND circuit 607 functions to provide a signal indicating that the horizontal field search has ended. The output of logical AND circuit 607 is connected to an input of logical AND circuit 419 of mode control circuitry 400.

The logical AND circuit 419 also has an input connected to the output of logical AND circuit 632. Logical AND circuit 632 functions to define when the vertical field search has been completed. A matching of the voltage of the vertical main integrator 650 to the voltage of the vertical format integrator 325 takes place in substantially the same manner as that for matching the voltage of integrator 625 to that of integrator 310. This matching process is primarily accomplished through voltage discriminator 630, trigger 631, logical OR circuits 633, 639 and 646 and logical AND circuit 641.

The voltage of the end of field main integrator 360 is matched to the voltage of the end of field format integrator 350 through the facility of voltage discriminator 361 and triggers 362 and 363. The voltage of the end of field main integrator 360 could be greater than or less than the voltage of the end of field format integrator 350. If the voltage of the end of field main integrator 360 is less than the voltage of the end of field format integrator 350, then trigger 362 is set when the inputs to logical AND circuit 416 are satisfied, and the end of field main integrator 360 is caused to develop a positive going voltage. If the voltage of the end of field main integrator 360 is less than the voltage of the end of field format integrator 350, then trigger 363 is set when the inputs to logical AND circuit 416 are satisfied. When trigger 363 is set, the end of field main integrator 360 is caused to develop a negative going voltage. When the voltage discriminator 361 has an output to condition trigger 362 for setting, it causes trigger 363 to be reset and when it has an output for conditioning trigger 363 to be set, this output also resets trigger 362. Of course, the field search trigger 415 can only be set when both triggers 362 and 363 are reset in view of the inputs to logical AND circuit 414. When the voltage of the end of field main integrator 360 is matched to the voltage of the end of field format integrator 350, either trigger 362 or 363 will be set depending upon the lack of differences in voltage between the two integrators. Thereafter, when the voltage of the end of field main integrator 360 matches the voltage of the end of field format integrator 350, then voltage discriminator 361 will have an output which will reset the trigger 362 or 363 whichever had been set but will not set the non-set trigger of the triggers 362 or 363 because the conditions to logical AND circuit 416 have already been satisfied and there will be no A.C. signal therefrom. Hence, when the voltage of the end of field main integrator 360 matches that of integrator 350, both triggers 362 and 363 will be reset and inverter 365 will not be conducting whereby logical AND circuit 414 will again be conditioned to enable the setting of trigger 415.

The field search trigger 415 is reset upon the inputs to logical AND circuit 419 being satisfied. The inputs to logical AND circuit 419 are satisfied when there are outputs from logical AND circuits 607 and 632 indicating that the horiontal and vertical field search has ended. With the field search trigger 415 reset, the operation will switch to a character search mode, a scan and count-mode or an error measurement mode. The mode is determined by the operation code character in register 240. The OFF output of the trigger 415 is connected to the A.C. set terminals of the character search trigger 425, of the scan and count trigger 427 and of the error measurement scan 1 trigger 435. The D.C. gates of these triggers are connected to the outputs of logical AND circuits 420, 426 and 430 respectively. Logical AND circuits 420, 426 and 430 examine the operation code character in register 240.

Logical AND circuit 420 has an input connected to the ON output of trigger TB and an input connected to the OFF output of trigger T8 of register 140. It also has an input connected to the output of inverter 365. By this arrangement the character search trigger 425 can only be set upon the field search trigger 415 going OFF and when there is a B bit and not an 8 bit register 240 and if both triggers 362 and 363 are OFF or reset. The reason for this latter requirement is that a character search should not be started until the field barrier has been defined. This of course takes place when the voltage of the end of field main integrator 360 matches the voltage of the end of field format integrator 350.

Logical AND circuit 426 has inputs connected to the ON side of trigger TB, the ON side of trigger T8, and the OFF side of trigger T4 of register 240 respectively. The scan and count trigger 427 functions to provide a mode of operation for diagnostic purposes and for developing a calibration chart for the cathode ray tube 10.

Logical AND circuit 430 determines when the operation switches from a field search mode to an error measurement mode. Logical AND circuit 430 has inputs connected to the OFF outputs of triggers TA and TB respectively of register 240. Thus it is seen that when the operation code character in register 240 does not include an A bit and not a B bit, logical AND circuit 430 will pass a signal to its output and the error measurement scan 1 trigger 435 will be SET when the field search trigger 415 is reset. The operation code character of course does not include an A bit or a B bit and therefore, at this particular time, for control word 110 the operation code character 1 effectively conditions logical AND circuit 430 whereby the scan 1 trigger 435 is set upon the field search trigger 415 being reset. The ON output of the scan 1 trigger 435 is connected to the inputs of logical AND circuits 513, 529 and 536 of the error control circuit 500 and to an input of a logical OR circuit 438 of the mode control circuit 400. The logical AND circuits 513, 529 and 536 also have inputs connected to the outputs of logical AND circuits 503, 526 and 533 respectively. The outputs of the logical AND circuits 513, 529 and 536 are connected to the negative integrators of the vertical corner integrator 520, to one of the negative integrators of the horizontal edge integrator 530, and to one of the negative integrators of the skew integrator 540 respectively.

When logical AND circuit 513 passes a signal from its output, vertical corner integrator 520 develops a voltage for deflecting the beam vertically downward from the cathode ray tube home position 13 until it engages reference line 21. Logical AND circuit 513 is conditioned to pass an output by logical AND circuit 503. Logical AND circuit 503 has inputs connected to the OFF output of trigger TA, the OFF output of trigger TB, the OFF output of trigger T8 and the OFF output of trigger T4, all of register 240.

Horizontal edge integrator 530 develops a voltage for deflecting the beam from position 30, FIG. 6, horizontally toward line 31. Logical AND circuit 526 has inputs connected to the OFF outputs of triggers TA and TB and to the ON output of trigger T8. Skew integrator 540 develops a voltage for deflecting the beam from position 25 horizontally toward line 26, FIG. 6. Logical AND circuit 533 has inputs connected to the OFF outputs of triggers TA, TB, T8 and the ON output of trigger T4 all of register 240.

In view of the fact that the control character in position 698 of control word 110 is now residing in register 240 and is a 1, only the inputs to the logical AND circuit 503 are satisfied. Therefore, only logical AND circuit 513 is conditioned whereby when the scan 1 trigger 435 turns ON, the logical AND circuit 513 passes a signal to the vertical corner integrator 520 which develops a voltage for deflecting the beam vertically downward from the cathode ray tube home position 13 until it engages reference line 21. It should be noted that the vertical corner integrator was reset to a plus 4 volts at 1st DIGIT time. The output of vertical corner integrator 520 is connected as an input to a voltage discriminator 514 which also has an input connected to plus 4 volts. The output of the voltage discriminator is connected to the reset terminal of a reset control latch 515 which has its output connected to the plus integrator of the vertical corner integrator. Hence, when latch 515 is set, the vertical corner integrator 520 develops a positive going voltage until latch 515 is reset. This happens when the voltage of the vertical corner integrator reaches plus 4 volts. The set terminal of latch 515 is connected to the output of a logical AND circuit 502. Logical AND circuit 502 has one input connected to the output of logical AND circuit 220 and another input connected to the output of logical AND circuit 503. Under these conditions, latch 515 is set when logical AND circuit 220 passes a signal thereto because the inputs to logical AND circuit 503 are satisfied by the control character in register 240. It should be noted that the vertical corner integrator 520 could be reset to any suitable voltage and plus 4 volts is used by way of example only.

When the beam engages the reference line 21, a signal is generated for resetting the scan 1 trigger 435. This is accomplished by a circuit including photomultiplier tube 50 which has its output connected to video clipping circuitry 60. The video clipping circuitry 60 is of the type known in the prior art and therefore the details of it are not shown. The output from the video clipping circuitry 60 is connected to an input of a logical OR circuit 432 of mode control circuit 400. Logical OR circuit 432 has its output connected to an input of a singleshot multivibrator 433. The output of the singleshot multivibrator 433 is connected to the A.C. reset inputs of the scan 1 trigger 435 and the scan 2 trigger 440. Hence, when singleshot multivibrator 433 fires, scan 1 trigger 435 and scan 2 trigger 440 are reset. In the event that the beam does not engage the reference line 21 within a predetermined time as determined by delay 439, an error measurement signal is generated. This error measurement signal is transmitted to the control unit 100.

The circuitry for developing the error measurement signal includes inverter 436 which has its input connected to the output of singleshot multivibrator 433. The output of inverter 436 is connected to an input of logical AND circuit 437 which also has an input connected to the output of a logical OR circuit 438. The output of logical AND circuit 437 is connected to the input of delay 439 which has its output connected to an input of logical OR circuit 432 and to an input of control unit 100. Logical OR circuit 438 has inputs connected to the ON outputs of triggers 435 and 440 respectively. The delay 439 will have an output only if the input thereto is up for a period longer than which the delay is set. Thus, it is seen that if the beam does not engage line 21 within the period of time determined by delay 439, an error measurement signal is developed and the scan 1 trigger 435 is reset because logical OR circuit 432 will pass a signal from delay 439 to fire singleshot multivibrator 433.

The scan 2 trigger 440 has its D.C. gate connected to the OFF output of trigger T8 of register 240. The A.C. set terminal of scan 2 trigger 440 is connected to the OFF output of scan 1 trigger 435. Hence if the operation code character in register 240 does not include an 8 bit, the scan 2 trigger 440 will be turned ON upon the scan 1 trigger 435 being turned OFF.

The scan 2 trigger has its set output connected to logical OR circuit 438 and to inputs of logical AND circuits 505 and 542 of error control circuit 500. Logical AND circuit 505 also has an input connected to the output of logical AND circuit 503. It will be recalled that logical AND circuit 503 is conditioned by the operation code character within register 240. Logical AND circuit 542 has as input connected to the output of logical AND circuit 533. Logical AND circuit 533, it will be recalled, has inputs connected to the OFF output of trigger TA, the OFF output of trigger TB, the OFF output of trigger T8 and the ON output of trigger T4. Since the character in the register 240 does not include a 4 bit, the inputs to logical AND circuit 533 are not satisfied and therefore logical AND circuit 542 will not be conditioned at this time. The inputs to logical AND circuit 503 are satisfied at this time, and therefore logical AND circuit 505 will be conditioned to pass a signal.

The output of logical AND circuit 505 is connected to the negative integrators of horizontal corner integrator 510. The horizontal corner integrator is reset the same way as the vertical corner integrator but by voltage discriminator 501, logical AND circuit 502 and latch 504. The horizontal corner integrator 510 develops a voltage for driving the beam horizontally to the left towards the reference line 22 as shown in FIG. 6. The beam had moved upward away from reference line 21 after having engaged it and before the beam was moved horizontally toward line 22. This action will be described later herein. Accordingly, the beam is deflected in a horizontal direction by the voltage developed by the horizontal corner integrator 510. The outputs from the horizontal and vertical corner integrators 510 and 520 are respectively connected to the horizontal and vertical voltage summers, amplifiers, and deflection circuitry 75.

The horizontal corner integrator 510 develops a deflection voltage so long as the scan 2 trigger 440 is set. It will be recalled that the scan 2 trigger 440 is reset when either the beam engages reference line 22 or after a predetermined time determined by delay 439.

When scan 2 trigger 440 turns OFF, all mode triggers will be OFF and therefore, the inputs to logical AND circuit 418 will be satisfied and the beam is then deflected in an aging mode. Whenever the beam goes into aging, a signal is passed from logical AND circuit 418 to control unit 100 and this signal is indicative that the operation has been completed. The output of logical AND circuit 418 is connected to an input of a logical OR circuit 608 and to an input of a logical AND circuit 638, both of the beam control circuit 600. The output of logical OR circuit 608 is connected to a negative integrator of horizontal main integrator 625. Hence, whenever in an aging mode, the horizontal main integrator 625 will be operative to develop a voltage for deflecting the beam horizontally. The negative integrator of the horizontal main integrator 625 connected to the logical OR circuit 608 causes the beam to move horizontally from right to left rather slowly. As the beam approaches the left edge of the cathode ray tube, the horizontal main integrator 625 will be at approximately minus 4 volts and when it becomes more negative, voltage discriminator 617 referenced to minus 4 volts, passes a signal for resetting horizontal latch 613. The OFF output of latch 613 is connected to a positive integrator of the horizontal main integrator 625. This positive integrator develops a voltage for driving the beam horizontally to the right until the horizontal main integrator 625 reaches plus 4 volts. When this occurs, voltage discriminator 611, reference to plus 4 volts, passes a signal via logical OR circuit 612 to SET latch 613. With latch 613 SET, the positive integrator of horizontal main integrator 625 is no longer active. It should be noted that the positive integrator of integrator 625 is strong enough to override the negative integrator connected to the output of logical OR circuit 608. After the beam is returned to the right side, it again moves horizontally to the left as the negative integrator is activated by the logical OR circuit 608. This action continues while in the aging mode.

The output of the logical AND circuit 638, which also receives an aging signal from logical AND circuit 418, is connected to inputs of logical OR circuits 633 and 639, which have their outputs connected to inputs of logical AND circuit 641. The output of logical AND circuit 641 is connected to a fast negative integrator of vertical main integrator 650. Hence, it is seen that the fast negative integrator of the vertical main integrator 650 will be turned ON whenever in an aging mode and when the other input condition to logical AND circuit 638 is satisfied. Logical AND circuit 638 has its other input connected to the ON output of a latch 637. Latch 637 has its set terminal connected to the output of a logical OR circuit 636. Logical OR circuit 636 has an input connected to the output of logical AND circuit 416 of the mode control circuit 400 and an input connected to the output of voltage discriminator 634. The voltage discriminator 634 has a plus 4 volts reference input and an input connected to the output of the vertical main integrator 650. The voltage discriminator 634 will have an output when the vertical main integrator 650 is reset to plus 4 volts. It should also be noted that latch 637 has its reset terminal connected to the output of a voltage discriminator 642. The voltage discriminator has an input connected to a minus 4 volts and an input connected to the output of the vertical main integrator 650. Voltage discriminators 634 and 642 determine the upper and lower vertical excursion limits of the beam. Hence, when the vertical main integrator 650 develops a voltage equal to minus 4 volts, the discriminator 642 has an output which resets latch 637. The OFF output of latch 637 is connected to an input of a logical OR circuit 646 which has its output connected to the positive integrator of the vertical main integrator 650. The vertical main integrator 650 is thereby operated to develop a positive voltage whereby when this voltage reaches a plus 4 volts, voltage discriminator 634 has an output for setting latch 637 via logical OR circuit 636. In this manner, the beam is deflected vertically in both a positive and negative direction during an aging mode.

Summarizing at this time, control word 110 was first examined and the operation code character in storage character position 698 is stored in register 240. This operation control character signifies that an upper right corner measurement is to be made. The horizontal, vertical and end of field format integrators 310, 325 and 350 are effectively reset by 1st RESET signal from logical AND circuit 230. The integrators 510, 520, 530, 540 and 545 are effectively reset by a 1st DIGIT signal from logical AND circuit 220. The bits 4 and 8 in the character storage position 700 then start integrators 310, 325 and 350. The bits A, 8 and 2 in character storage position 701 turn OFF the vertical fine integrator of integrator 325 and the end of field coarse and end of field fine integrators of integrator 350, respectively. The 4 bit in character storage position 702 then turns OFF the horizontal coarse integrator of integrator 310. The B bit in character storage position 703 turns OFF the vertical coarse integrator of integrator 325. The 1 bit in character storage position 704 then stops or turns OFF the horizontal fine integrator of integrator 310. Therefore, it is seen that the vertical fine integrator of integrator 325 is ON for one character time, or 11.5 microseconds while the vertical coarse integrator thereof is ON for three character times, or 34.5 microseconds. Hence, the fine and coarse vertical integrators of integrator 325 develop a deflection voltage for vertically deflecting the beam downwardly 310 mils. This deflection voltage is stored in the integrator 325 and when the end of the control word is reached, an equal voltage is developed by the vertical main integrator 650 to deflect the beam via deflection circuitry 75.

Similarly, the horizontal coarse integrator of integrator 310 is ON for two character times, or 23 microseconds and the horizontal fine integrator thereof is ON for four character times or 46 microseconds. Thus, the horizontal fine and coarse integrators of integrator 310 will develop a deflection voltage for deflecting the beam horizontally 240 mils. This voltage is also stored by the integrator 310 until the end of the control word is reached. Thereafter, the voltage of integrator 625 is matched to the voltage of integrator 310. This action takes place during the field search mode.

The fine and coarse end of field integrators are ON for one character time. The voltage of integrator 360 is matched to the voltage of integrator 350 when operating in the field search mode. Upon reaching the end of the control word, the field search mode is initiated automatically by turning on trigger 415.

The beam is then deflected from the cathode ray tube home position to the cathode ray tube reference position by action of the voltages developed by integrators 625 and 650. The mode again changes and this time to an error measuring mode whereby the beam is respectively deflected from the cathode ray tube reference position to the reference lines 21 and 22. The deflection voltages for deflecting the beam to the reference lines 21 and 22 are stored in the vertical and horizontal corner integrators 520 and 510 respectively, which had been reset to plus 4 volts. If there were no error, then these integrators would be at zero volts. Thereafter, the mode switches to an aging mode and control unit 100 is signalled that the operation has been completed.

With the operation complete, the next control word within control unit 100 is examined. The next control word is control word 115 of FIG. 8. Control word 115 is assembled via the index register of the control unit 100 and occupies the same area of storage but not necessarily the same positions which had been occupied by control word 110. The index register is three digits in length and permits address modification. This enables the coarse and fine coordinate positions as shown in FIG. 7 to modify addresses via the index register and thus aid in the assembly of the control words. Storage position 698 contains the operation code character of control word 115. The operation code character is a five and, with reference to FIG. 9, it is seen that an operation code character 5 signifies that a measurement of the lower right corner-normal length is to be made. This measurement takes place in a manner very similar to the measurement of the upper right corner in that the beam is first positioned to the skew and vertical edge error reference point 25, as shown in FIG. 6, and thereafter the beam is deflected to reference lines 26 and 27 respectively. Thus, the operation code character 5 consisting of the bits 4 and 1 is stored in register 240.

During the next character time, the integrators of the digital to analog converter circuit 300 and of the error control circuit 500 are reset. Thereafter, during the next character time the bits 4 and 8 in storage position 700 are examined by logical AND circuits 314, 326 and 340 of circuit 300. Each of these logical AND circuits have inputs connected to control unit 100 for receiving bits 4 and 8. Hence, since the bits 4 and 8 are present in character storage position 700, and when these bits are transferred from the control unit 100 during storage position 700 time as defined herein, the logical AND circuits 314, 326 and 340 will pass a signal.

The logical AND circuit 314 has its output connected to the set terminal of coarse latch 315 and fine latch 319. The ON output of coarse latch 315 is connected to an input of a logical OR circuit 313 which has its output connected to the coarse integrator of the horizontal format integrator 310. The output of coarse latch 315 is also connected to positive and negative inputs of vertical format integrator 325. The ON output of fine latch 319 is directly connected to the fine integrator of the horizontal format integrator 310. The coarse and fine latches 315 and 319 have their reset terminals connected to outputs of logical OR circuits 316 and 320 respectively. Logical OR circuits 316 and 320 each have an input connected to the output of inverter 236 which will be conductive at this time because of the presence of a WRT CALL signal. Logical OR circuit 316 also has an input connected to the output of a logical AND circuit 317. Logical AND circuit 317 has an input connected to control unit 100 to receive a 4 bit and an input connected to the output of an inverter 318 which, when not conducting, provides a signal indicating that an 8 bit is not present from control unit 100. Logical OR 320 also has an input connected to control unit 100 to receive a 1 bit therefrom.

Briefly then, the coarse latch 315 can be reset by a $\overline{\text{WRT CALL}}$ signal or by the combination of an input 4 and a not input 8 signal. The fine latch 319 can be reset by a $\overline{\text{WRT CALL}}$ signal or by an input 1 signal from control unit 100. The bias inputs 308 and 309 to the horizontal format integrator 310 will be described in detail later herein. They effectively correct for horizontal edge error and vertical skew error respectively.

The horizontal format integrator 310 is reset under control of reset latch 311 which has its ON output connected to the horizontal format integrator 310. The set input of the reset latch 311 is connected to an output of logical AND circuit 230. Logical AND circuit 230 provides a 1st RESET signal which sets latch 311. The reset input of latch 311 is connected to the output of a voltage discriminator 312. The voltage discriminator 312 is referenced to a pulse 4 volts and also has an input connected to the output of the horizontal format integrator 310. When latch 311 is SET, integrator 310 develops a positive going voltage. The voltage discriminator 312 passes an output signal when the positive going voltage of integrator 310 reaches plus 4 volts. This output signal resets latch 311, and integrator 310 is thus reset to plus 4 volts.

The output of logical AND circuit 326 is connected to the coarse and fine latches 327 and 328 respectively. The output of the coarse latch 327 is connected to an input of logical OR circuit 329, to positive and negative inputs of the horizontal format integrator 310, and to positive and negative inputs of the end of field integrator 350. Logical OR circuit 329 has an input connected to the output of a voltage discriminator 334 and the output of logical OR circuit 329 is connected to the input of the coarse integrator of the vertical format integrator 325. The ON output of the fine latch 328 is connected directly to the fine integrator of the vertical format integrator 325. The latches 327 and 328 have their reset terminals connected to outputs of logical OR circuits 331 and 332 respectively. Logical OR circuit 331 has an input connected to control unit 100 for receiving a B bit and an input connected to the output of inverter 236 for receiving a $\overline{\text{WRT CALL}}$ signal. Logical OR circuit 332 also has an input connected to inverter 236 for receiving the $\overline{\text{WRT CALL}}$ signal and an input connected to control unit 100 for receiving an A bit.

The vertical format integrator 325 is reset under control of reset latch 333 which has its output connected thereto. The set input of latch 333 is connected to the output of logical AND circuit 230 of the operation code register and control circuitry 200. The reset terminal of latch 333 is connected to the output of voltage discriminator 334. Voltage discriminator 334 has one input connected to a plus 4 volts supply and an input connected to the output of the vertical format integrator 325. The resetting operation takes place is substantially the same manner as described for resetting integrator 310 to plus 4 volts.

Logical AND circuit 340 controls the setting of coarse and fine latches 341 and 342 respectively, inasmuch as its output is connected to the set terminals of these latches. The ON output of the coarse latch 341 is connected to an input of a logical OR circuit 343 and the ON output of fine latch 342 is connected to the fine integrator of the end of field integrator 350. Logical OR circuit 343 has its output connected to the coarse integrator of the end of field integrator 350. The end of field integrator 350 is reset under control of a reset latch 347 which has its output connected thereto and an input connected to the output of logical AND circuit 230. The reset terminal of latch 347 is connected to the output of voltage discriminator 348 which also has its output connected to an output of logical OR circuit 343. The voltage discriminator 348 has one input connected to a plus 4 volts and an input connected to the output of the end of field integrator 350.

The coarse and fine latches 341 and 342 have their reset terminals connected to outputs of logical OR circuits 345 and 346 respectively. Each of these logical OR circuits has an input connected to the output of inverter 236 so as to receive a $\overline{\text{WRT CALL}}$ signal. Additionally, logical OR circut 345 has an input connected to the output of a logical AND circuit 344, the same having an input connected to control unit 100 for receiving an 8 bit and an input connected to the output of an inverter 339 which has its input connected to control unit 100 for receiving a 4 bit. Logical OR circuit 346 has an input connected to control unit 100 for receiving a 2 bit.

It is thus seen that the bits 4 and 8 in storage position 700 of control word 115 will start the horizontal, vertical and end of field format integrators 310, 325 and 350. The horizontal and vertical format integrators 310 and 325 will develop and store a voltage at this time to subsequently deflect the beam in the resultant direction. During the next character time, the end of field fine and coarse integrators are turned OFF because the bits 2 and 8 are present whereby the coarse and fine latches 341 and 342 are switched OFF or reset via the logical OR circuits 345 and 346 respectively. The 4 bit in character storage position 702 turns OFF the horizontal coarse integrator as it resets the coarse latch 315 via the logical OR circuit 316. Logical OR circuit 316 will receive a signal from logical AND circuit 317 at this time because there will be a 4 bit and not an 8 bit in control unit 100. During the next character time, those integrators which are still on will remain on for this particular character time. During the next character time, there is a 1 bit in character position 704 and this turns OFF the horizontal fine integrator by resetting the fine latch 319 via the logical OR circuit 320. The vertical integrators will still be operating during the next character time. Thereafter, during the character time for storage position 706, the vertical fine integrator will be turned OFF because of the presence of an A bit which resets the fine latch 328 via the logical OR circuit 332. The coarse integrator remains ON until character storage position 740 time, which contains a B bit. The B bit resets the coarse latch 327 via the logical OR circuit 331. Since the end of the control word has been reached, the storage unit within the 1401 Data Processing System will have a group mark word mark to indicate the end of the control word and upon sensing this mark, the WRT CALL signal is terminated.

With the WRT CALL signal terminated, the field search trigger 415 switches ON because its D.C. gate is satisfied and the inputs to logical AND circuit 414 are satisfied. During the time the field search trigger is ON, the voltages of the main integrators 625, 650 and 360 are matched to the format integrators 310, 325 and 350 respectively. Upon this match occurring for integrators 625 and 650, the inputs to logical AND circuit 419 are satisfied and consequently the field search trigger 415 is reset.

The operation code character in register 240 will condition only the logical AND circuit 430 and hence only the D.C. gate of error measurement scan 1 trigger 435 is conditioned at the time trigger 415 is reset.

The scan 1 trigger 435 will be turned ON upon the turning OFF of the field search trigger 415, as previously described in connection with the upper right corner measurements. However, while scan 1 trigger 435 is ON at this time, only logical AND circuit 536 will be conditioned by the operation code character via logical AND circuit 533. The output of the logical AND circuit 536 is connected to logical OR circuit 608 of the beam control circuit 600, to one negative integrator of the skew integrator 540 and to an input of the logical AND circuit 537 which has its output connected to another negative integrator of skew integrator 540. The logical AND circuit 537 is effective only for short span documents.

The output of the logical OR circuit 608 as previously described, is connected to a negative integrator of horizontal main integrator 625. This connection enables horizontal main integrator 625 to develop a deflection voltage for driving the beam from point 25 until it engages reference line 26. When the beam engages reference line 26, the scan 1 trigger 435 is reset in a manner as previously described. Further, since the operation code character does not include an 8 bit, the scan 2 trigger 440 will be turned ON as the scan 1 trigger 435 turns OFF. It should be noted that the skew integrator 540 stores a voltage corresponding to the voltage required to deflect the beam from point 25 to line 26. However, the integrator 540 was reset to plus 4 volts. If there were no skew error, then the voltage stored by integrator 540 would be zero. It should also be remembered that this stored voltage is applied to biases 309 and 352 and the inverse voltage is applied to bias 324 of the format integrators 310, 350 and 325 respectively. With the scan 2 trigger 440 ON, logical AND circuit 542 will pass a signal because it is conditioned by the operation code character via logical AND circuit 533. The output of logical AND circuit 542 is connected to one of the negative integrators of vertical main integrator 650. The vertical main integrator 650 thereby develops a negative voltage for driving the beam vertically downward until it engages line 27 on the document 20. Logical AND circuit 542 has its output also connected to an input of one negative integrator of vertical edge integrator 545 and to an input of logical AND circuit 543. Logical AND circuit 543 also has an input connected to the ON output of trigger T2 of register 240. The output of logical AND circuit 543 is connected to another negative integrator of vertical edge integrator 545. Since a 2 bit is not present in the operation code character under consideration, logical AND circuit 543 will not be conditioned at this time. However, because logical AND circuit 542 has an output, the vertical edge integrator 545 will store a voltage corresponding to the voltage for driving the beam to the reference mark or line 27 on the document 20. The actual voltage stored is reference voltage plus 4 volts minus the voltage corresponding to the deflection voltage. If there is no vertical edge error, then the voltage stored is zero. This stored voltage is used as a bias voltage and is applied to the bias 323 of the format integrator 325 which develops a deflection voltage.

When the beam engages reference line 27, scan 2 trigger 440 is reset because the signal from video clipping 60 will be passed by logical OR circuit 432 to singleshot multivibrator 433, and it develops a signal for resetting scan 2 trigger 440. With the scan 2 trigger 440 reset, all inputs to logical AND circuit 418 will be satisfied and the beam is switched to an aging mode. Additionally, as previously indicated, a signal passes from logical AND circuit 418 to the control unit 100, signalling the same that the operation has been completed.

The next word transferred via the index register within the storage unit of the 1401 Data Processing System is word as shown in FIG. 8. Storage position 698 contains the operation code character which, in this instance, consists of a 9 made up of a 1 bit and an 8 bit. With reference to FIG. 9, it is seen that operation code character 9 designates the measurement of the left corner—normal length. This measurement is for detecting horizontal edge error. Horizontal edge error has been previously defined and it will be recalled that it is very similar to vertical edge error. The beam is positioned to the horizontal edge error reference point 30 in the same manner that the beam was positioned to the skew and vertical edge error reference point 25, and therefore, further description of this positioning will not be given. However, with reference to control word 120 in FIG. 8, it is seen that the bits 4 and 8 in storage position 700 start the integrators of the digital to analog converters 300 and thereafter the integrators are turned OFF in accordance with the bits in the storage positions 701, 702, 705, 709 and 759. Thereafter the field search trigger 415 is turned ON and the voltage of integrators 625, 650 and 360 are matched to the voltages of integrators 310, 325 and 360 respectively. Then the beam is positioned to the horizontal edge error reference point 30. The field search trigger 415 is then turned OFF in the same manner as previously described. As trigger 415 turns OFF, the scan 1 trigger 435 switches ON because the operation code character again does not contain an A bit and a B bit.

With the scan 1 trigger 435 ON, the logical AND circuit 529 of the error control circuit 500 will be properly conditioned to pass a signal. The output of the logical AND circuit 529 is connected to one negative integrator of the horizontal edge integrator 530 and to an input of logical OR circuit 608 of the beam control circuit 600. It will be recalled that the output of the logical OR circuit 608 is connected to a negative integrator of the horizontal main integrator 625, and by this arrangement, the beam is driven from reference point 30 in a horizontal direction to engage line 31. When that occurs, scan 1 trigger 435 is reset. The scan 2 trigger 440 will not be set as the scan 1 trigger 435 becomes reset because of the presence of an 8 bit in the operation code register 240. Hence, since scan 2 trigger 440 does not become set, all inputs to the logical AND circuit 418 are satisfied and a signal appears at its output to switch the beam into an aging mode. The signal from the logical AND circuit 418 also signals the control unit 100 that the previous operation has been completed.

Since all error measurements have now been made, the beam of the cathode ray tube can be positioned to any desired field of scannable data. In this particular example, the beam is positioned sequentially to each field identified on the document shown in FIG. 6. It should be understood that the sequential ordering of the fields can be changed as desired. This is accomplished by the programmer who can call for the field control words in any order desired. The first field control word 125 is shown in FIG. 8.

The operation code character of control word 125 is a G and includes the bits B, A, 4, 2 and 1. This character will be stored in register 240. Thereafter during the next character time the integrators of the digital to analog conversion circuitry 300 and the appropriate integrators of error control circuit 500 as determined by the operation code character are reset. The bits 4 and 8 in storage position 700 set the coarse and fine latches for controlling format integrators 310, 325 and 350. The 2 bit in storage position 701 turns OFF the fine integrator of the end of field integrator 350. Thereafter, all integrators which still are ON remain ON until storage position 705 time. At that time, the fine integrators of the horizontal and vertical format integrators 310 and 350 are turned OFF. At character 708 time, the coarse integrator of the vertical format integrator 325 is turned OFF. At 709 and 725 character times respectively, the coarse integrators of the horizontal integrator 310 and the end of field integrator 350 are turned OFF respectively. It should be noted that while the horizontal, vertical and end of field format integrators 310, 325 and 350 are operative during this control word, the horizontal edge error voltage and vertical skew error voltage will be applied respectively to the biases 308 and 309 of the horizontal format integrator 310. The vertical edge error voltage and horizontal skew error voltage which is the inverse of the vertical skew voltage, are respectively applied to biases 323 and 324 of the vertical format integrator 325. The horizontal edge error voltage and vertical skew error voltage are respectively applied to biases 351 and 352 of the end of field format integrator 350. The voltages for correctly positioning the beam to the first field on document 20 are now stored in horizontal and vertical format integrators 310 and 325 respectively. Additionally, the end of field barrier is stored in the end of field format integrator 350.

Having reached the end of the control word, the WRT CALL signal is terminated and therefore field search trigger 415 is turned ON. The voltages stored in format integrators 310, 325 and 350 are transferred to main integrators 625, 650 and 360 respectively. The beam is deflected to the start of the first field on document 20. Further, the field search trigger is switched OFF because the inputs to logical AND circuit 419 have been satisfied.

This time the operation code character in register 240 conditions the inputs to logical AND circuit 420. However, it will be recalled that logical AND circuit 420 also has an input which is conditioned only after the voltage of the end of field format integrator 350 has been transferred to the end of field main integrator 360. If this transfer has not yet been completed, the beam switches into an aging mode. Thereafter, upon completion of the transfer of the voltage from the end of field format integrator 350 to the end of field main integrator 360, the field search trigger 415 is again turned on, the voltages in the horizontal and vertical format integrators 310 and 325 are again transferred to the main integrators 625 and 650 and the beam is re-positioned to the start of field 1. Again, the inputs to logical AND circuit 419 are satisfied and the field search trigger 415 is switched OFF. At this time, the inputs to logical AND circuit 420 will be satisfied and the character search trigger 425 will turn ON as the field search trigger 415 turns OFF. The beam of the cathode ray tube 10 then scans the characters in the field for information purposes. This scanning and the recognition of the information scanned does not form a part of this invention and therefore is not described.

During the information scanning, when the beam is deflected horizontally to a position corresponding to the end of field barrier set up in the end of field main integrator 360, the voltage of the horizontal main integrator 625 will match the voltage of the end of field main integrator 360. This comparison is accomplished by voltage discriminator 421 which has inputs connected to the outputs of integrators 360 and 625. The output of voltage discriminator 421 is connected to an input of a logical OR circuit 423 which has its output connected to the reset terminal of the character search trigger 425. By this arrangement, the character search trigger 425 is reset. It will be recalled that the OFF output of character search trigger 425 is connected to inputs of logical AND circuits 416 and 418. Hence, when the character search trigger 425 switches OFF, then if the next field as defined by the next field control word had been operated upon to set the voltages in the format integrators 310, 325 and 350, then when character search trigger 425 switches OFF, logical AND circuit 416 will pass a signal and the voltages of the main integrators 625, 650 and 360 will be matched to the voltages of integrators 310, 325 and 350. Thus the beam is substantially immediately directed to the next field.

The character search trigger 425 also can be reset by a programmed end of field signal coming from control unit 100 which has an output connected to an input of logical OR circuit 423. Additionally, as a precautionary or safety measure, the ON output of trigger 425 is connected to the input of a delay 422 which has its output connected to an input of logical OR circuit 423. The delay 422 provides an output signal if the character search trigger 425 has been in a search mode too long. This delay is approximately 200 milliseconds in this particular example. Further, if either the latch 613 or 637 is reset during a character search mode, then the character search trigger 425 is turned OFF. This is because the OFF outputs of these latches are connected to inputs of logical OR circuit 423 and they provide an indication that limits of the scan window of the cathode ray tube have been reached.

It is thus seen that control word 125 specifies the field on document 20 containing the information to be scanned. The horizontal and vertical deflection voltages and the end of field voltage barrier are developed by the digital to analog format integrators 310, 325 and 350 respectively during the control word time or WRT CALL time. Thereafter, the operation switches to a field search mode and the voltages of main integrators 625, 650 and 360 are respectively matched to the voltages of format integrators 310, 325 and 350. The beam is consequently deflected to the field location specified in the control word by the voltages of integrators 625 and 650 as they are applied to deflection circuitry 75. The mode then switches to either aging or character search depending upon whether or not the end of field voltage has been completely transferred to integrator 360. In any event, the mode will subsequently switch to a character search mode and the characters in the specified field will be scanned for information purposes. When the end of field barrier is reached, the mode switches from character search to either field search or aging depending upon if a new field control word had been operated upon during character search mode time.

This concludes the general description. From this description, it is seen that control words within control unit 100 are either error measurement or field control words. Also, it is seen that in this example there are three types of error measurement control words, namely, a corner error measurement, a skew and vertical edge error measurement and a horizontal edge error measurement control word. Each control word includes an operation code character and format integrator control bits. The control words vary in length according to their function. The operation code character is examined first. Thereafter, a character time is provided to enable resetting of the format integrators and of the appropriate error measurement integrators specified by the operation code character. During the next character time of the control word, all format integrators are started. Each format integrator includes a coarse and fine integrator and certain biases for error correction. Thereafter, the coarse and fine integrators of the format integrators are turned OFF as format control bits in the control word are encountered. During the time a control word is being operated upon, a SERVICE REQUEST signal will not be generated at the horizontal, vertical, end of field, vertical edge, horizontal edge and skew reset times because these outputs are all connected as inputs to a logical OR circuit 250. The output of logical OR circuit 250 is connected to the input of inverter 251 which has its output connected to an input of a logical AND circuit 252. Logical AND circuit 252 also has inputs connected to control unit 100 for receiving WRT CALL and SERVICE RESPONSE signals. The output of logical AND circuit 242 is indicative of SERVICE REQUEST, and it is connected to control unit 100.

Upon termination of the control word as indicated by $\overline{\text{WRT CALL}}$ Signal, the operation switches automatically to a field search mode. The beam of the cathode ray tube is then deflected under control of the beam control circuitry to the specified coordinate position. Thus, depending upon the operation code character, the mode will switch into either an error measurement mode, a character search mode, a scan and count mode or an aging mode. If the mode is an error measurement mode, the error measurement is made and thereafter the mode switches to aging and a new control word is operated upon by control unit 100. However, if the mode had been character search, then after that mode had been completed, the operation could switch either to field search or aging mode. The operation would switch to field search if a field search control word had been operated upon during the character search mode time. It is seen that the aging mode is an interim type of mode and provides a signal to the beam control circuitry when not in some other mode. The control unit 100 is informed of both the aging and character search modes. In response to this information, the control unit 100 can specifiy a new control word as determined by the program in the control unit. The scan and count mode provides a beam control signal whereby the beam can be moved in various directions for diagnostic purposes. This mode also can cause the beam to scan test documents to calibrate the system.

The general description gives a complete understanding of the invention both as to structure and mode of operation. However, in order that reference can be readily had to any portion of the invention, detailed descriptions follow for the operation code register and controls 200, the digital to analog converter circuitry 300, the mode control circuitry 400, the error control circuitry 500 and the beam control circuitry 600.

*Operation code register and controls*

The operation code register and control circuit 200, FIGS. 1 and 2, functions to store the first character of a control word coming from the control unit 100. The bit lines 1, 2, 4, 8A and B from the control unit 100 are connected to D.C. gates of triggers T1, T2, T4, T8, TA and TB respectively. These triggers also have A.C. set terminals which are connected to the ON output of a 1st DIGIT trigger 210. These triggers also have A.C. reset terminals connected to receive a WRT CALL signal from control unit 100. The WRT CALL signal is transmitted from control unit 100 prior to the first character being transmitted. Consequently, triggers T1, T2, T4, T8, TA and TB will be first reset prior to receiving a character from control unit 100.

The conductor for carrying the WRT CALL signal from the control unit 100 is also connected to the set terminal of a ZERO DIGIT trigger 215. The ON side of ZERO DIGIT trigger 215 is connected to the D.C. gate of the 1st DIGIT trigger 210. The A.C. set terminal of the 1st DIGIT trigger 210 is connected to control unit 100 so as to receive a SERVICE RESPONSE signal therefrom. The ON output of 1st DIGIT trigger 210 is connected to an input of a logical AND circuit 220 which also has an input from control unit 100 for receiving a timing signal therefrom. This timing signal is identified as 00–30 time. The ON output of 1st DIGIT trigger 210 is also connected to the A.C. set terminals of triggers T1, T2, T4, T8, TA and TB. Although the ON output of the 1st DIGIT trigger 210 is connected to set these triggers, only those triggers having their D.C. gates conditioned by the bits forming the first character will be set. When logical AND circuit 220 passes an output signal, it is indicative that the first digit or character has been set into register 240.

The output of logical AND circuit 220 is connected to the input of an inverter 225 which has its output connected to the reset terminal of ZERO DIGIT trigger 215. The output of logical AND circuit 220 is also connected to an input of a logical AND circuit 230. Logical AND circuit 230 also has an input connected to the output of a logical OR circuit 235, the same having inputs from the OFF output of trigger TA and the ON output of trigger TB. A signal appearing at the output of logical AND circuit 230 is representative as 1st RESET. The conductor for transmitting the WRT CALL signal from control unit 100 is also connected to the input of an inverter 236 and the output of this inverter provides a $\overline{\text{WRT CALL}}$ signal.

It can be summarized at this time that the operation code register and controls 200 provide signals indicative of the operation code character, and also provide signals indicating WRT CALL, WRT CALL, 1st DIGIT and 1st RESET.

The various scanner operation codes are shown in FIG. 9. These coded characters are represented according to the binary coded decimal code. The operation code character 1 specifies a measure upper right corner—normal length operation. Normal length indicates that the document is of a standard normal length, such as 8½ inches by 11 inches. The "scan window" of the flying spot scanner may not in all instances be large enough to scan the entire area of large area documents. In such instances, the document is indexed or advanced relative to the scanner whereby the entire area of the document is successively brought into reading position. Also, some documents are shorter than the normal length documents. These documents are distinguished from the normal length document by the term "short span." The reason for distinguishing between the documents is that the error measurement pre-printed reference lines are located in different positions than for normal length documents. Hence, it is necessary to operate the error integrators as designated by the operation code character for short span documents. The operation code character for effecting the measurement of the upper right corner—short span is 3. The operation code character 5 specifies measuring the lower right-hand corner—normal length, and the operation code character 7 specifies measurement of the lower right corner—short span. The operation code character 9 specifies measurement of the left corner—normal length and the operation code character # specifies measurement of the left corner—short span. The character for indicating that the next operation is a field scan is the character G. It should be noted that the operation code characters could be changed so as to include additional information, such as to identify the type of recognition to take place, i.e., handwriting, numeric information only, alphabetic information only, or alpha-numeric information. The operation code character could also specify when to interrupt a scan.

The measurement of the upper right corner—normal length without indexing the document utilizes the reference lines 21 and 22 shown in FIG. 6, while the operation for measuring the upper right corner—normal length where the document is indexed utilizes reference lines 26 and 27 for this measurement. When operating to measure the lower right corner—normal length un-indexed, reference lines 26 and 27 are used; whereas when operating to measure the lower right corner—normal length indexed, reference lines 28 and 29 are used. When measuring a left corner—normal length un-indexed, reference line 31 is used; and when measuring the left corner—normal length indexed, reference line 34 is used.

*Digital to analog converter circuitry*

The digital to analog converter circuitry 300 shown in FIGS. 1 and 2 develops beam deflection voltages by converting a digital time base to an analog voltage. The digital time base is specified or determined by the control word within control unit 100. This deflection voltage, however, is modified or corrected for skew error and vertical edge and horizontal edge errors. The modified or corrected deflection voltage is stored and when operating in a field search mode, the voltages of the horizontal, vertical and end of field main integrators 625, 650 and 360 are caused to match the voltages of corresponding integrators of the digital to analog circuitry 300.

Figure 3:
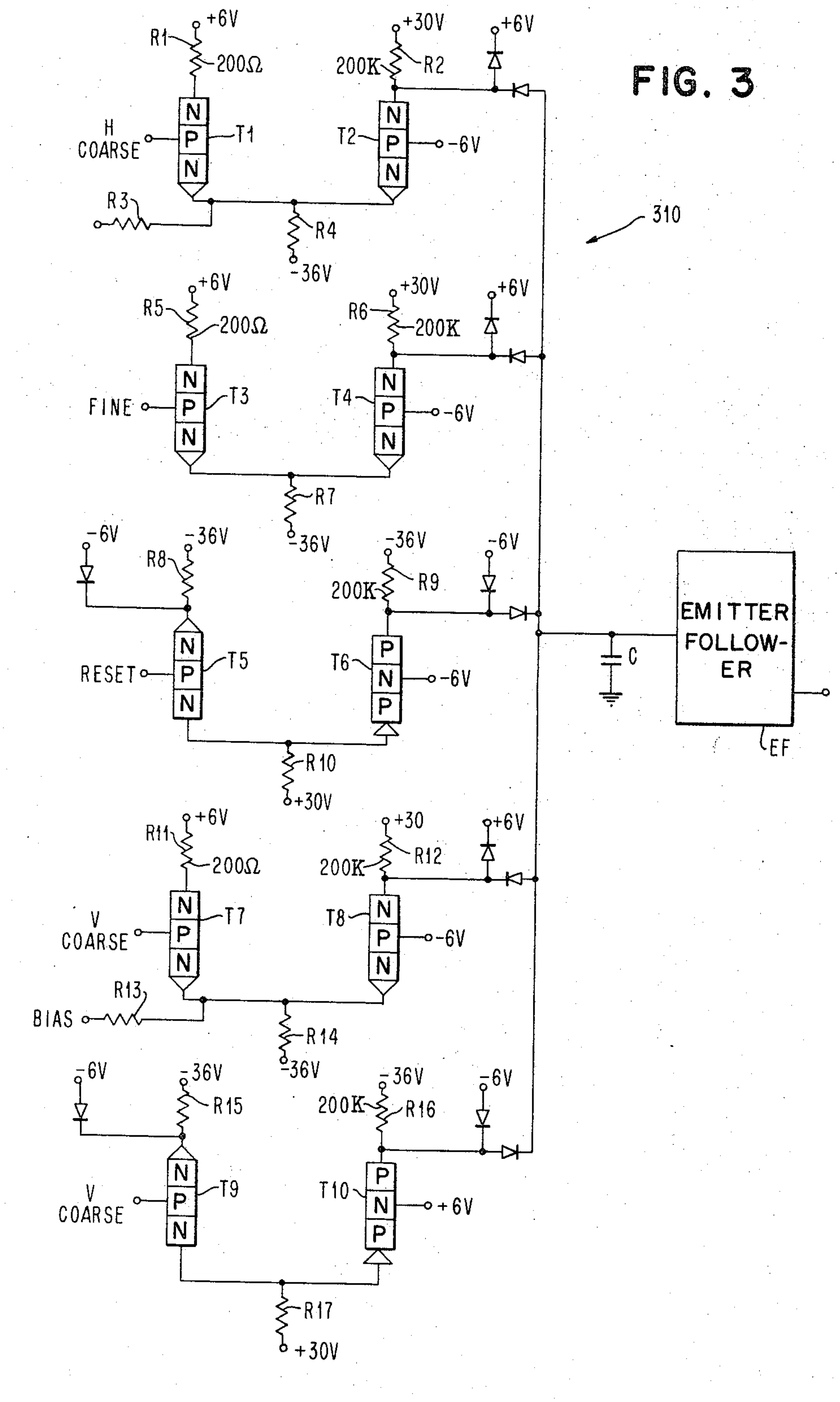
FIG. 3 is a schematic circuit diagram illustrating the horizontal format digital to analog integrator and storage circuits shown in block form in FIG. 2.

The digital to analog converter circuitry 300 includes a horizontal format integrator 310, a vertical format integrator 325, and an end of field integrator 350. These integrators are substantially identical and the details for the horizontal format integrator 310 are shown in FIG. 3. Each of these integrators includes a coarse, a fine and a positive resetting integrator. However, before describing the details of the horizontal format integrator 310, the logic circuitry for controlling the integrators 310, 325 and 350 will be described.

The horizontal format integrator 310 is reset under control of a latch 311 which has its set input connected to the output of logic AND circuit 230 of the operation code register and controls circuit 200. As it will be seen, all integrators of the digital to analog circuitry 300 are first reset before they are turned ON to develop a deflection voltage. The ON output of latch 311 is connected to the horizontal format integrator 310 so as to cause a plus voltage to be developed. The output from the horizontal format integrator 310 is connected to the input of a voltage discriminator 312 which is referenced to plus 4 volts. By this arrangement, the horizontal format integrator is reset to plus 4 volts. The voltage discriminator 312 is of the type shown in FIG. 5 and the details of this voltage discriminator will be described later herein. It is sufficient to say at this time that the voltage discriminator develops an output signal when the input matches the reference voltage. The output of the voltage discriminator 312 is connected to the reset terminal of the latch 311 and to an input of logical OR circuit 313. When the voltage discriminator 312 provides an output signal to reset latch 311, the horizontal format integrator 310 will no longer develop an increasing or positive going voltage. Additionally, so long as there is an output either from the latch 311 or the voltage discriminator 312, the control unit 100 is held up from transmitting the next character of the control word.

The output of the logical OR circuit 313 is connected to the coarse integrator of the horizontal format integrator 310 so as to cause the same to develop a negative deflection voltage. This coarse integrator develops a deflection voltage to deflect the beam 100 mils horizontally for each 11.5 microseconds. However, the actual deflection will be plus or minus, depending upon the bias voltage due to horizontal edge error correction voltage. At this reset time, the output from the voltage discriminator 312 will cause the horizontal format integrator 310 to develop a negative voltage slightly below the reset or reference voltage of plus 4 volts. When the voltage of the horizontal format integrator 310 goes below the reference voltage of 4 volts, the voltage discriminator 312 no longer has an output, and since the latch 311 is already reset, there is no output from it and the control unit 100 will send over the next character of the control word. A blank character time within the control word enables this resetting operation to take place. In this example, character storage position 699 is blank to facilitate the reset operation.

Logical OR circuit 313 also has an input connected to the ON output of a coarse latch 315. The set terminal of coarse latch 315 is connected to the output of a logical AND circuit 314, the same having inputs connected to control unit 100 for receiving a 4 bit and an 8 bit. The reset terminal of latch 315 is connected to the output of a logical OR circuit 316, the same having an input connected to the output of inverter 236 so as to receive a $\overline{\text{WRT CALL}}$ signal, and an input connected to the output of a logical AND circuit 317. Logical AND circuit 317 has an input connected to control unit 100 for receiving a 4 bit, and an input connected to the output of an inverter 318, the same having an input connected to control unit 100 for receiving an 8 bit. It is thus seen that a signal passed by logical AND circuit 314 sets the coarse latch 315, and a signal passed by logical OR circuit 316 resets the coarse latch 315.

The same signal which sets the coarse latch 315 also sets the fine latch 319. This is accomplished by connecting the output of the logical AND circuit 314 to the set terminal of the fine latch 319. The output of the fine latch 319 is connected to the fine integrator of the horizontal format integrator 310. The fine latch 319 has its reset terminal connected to the output of a logical OR circuit 320. The logical OR circuit 320 has an input connected to the output of inverter 236 for receiving a $\overline{\text{WRT CALL}}$ signal, and an input connected to the control unit 100 for receiving a 1 bit. Hence, both the coarse and fine latches 315 and 319 will be reset by a $\overline{\text{WRT CALL}}$ signal and the fine latch 319 will otherwise be reset by a 1 bit within the control word.

With reference to FIG. 10, it is seen that a 1 bit has the function of stopping the horizontal fine integrator and a 4 bit has the function of stopping the horizontal coarse integrator. The horizontal format integrator 310 is provided with a bias element 308 for the coarse integrator and a bias 309 for biasing the output of the horizontal format integrator 310. The bias 308 corrects or compensates for horizontal edge error and the bias 309 corrects or compensates for vertical skew error. Hence, the bias 308 has its input connected to the output of the horizontal edge integrator 530 and the bias 309 is connected to the output of skew integrator 540.

The vertical format integrator 325 and the end of field format integrator 350 are reset under control of latches 333 and 347 respectively. Logical AND circuits 326 and 340 control the setting of coarse and fine latches 327 and 328 and coarse and fine latches 341 and 342 respectively. All coarse and fine latches are resettable by the $\overline{\text{WRT CALL}}$ signal. The coarse latch 327 is also resettable by a B bit and the fine latch 328 is resettable by an A bit. Similarly, the coarse latch 341 is resettable by an 8 bit and the fine latch 342 is resettable by a 2 bit. The coarse latches 327 and 341 control the coarse integrators of the vertical and end of field integrators 325 and 350 respectively. The fine latches 328 and 342 control the fine integrators of the vertical format and end of field format integrators 325 and 350 respectively. Bias 323 serves to correct the coarse integrator of the vertical integrator 325 for vertical edge error and it is connected to the output of vertical edge integrator 545. Bias 324 provides compensation or correction for horizontal skew error and it is connected to the output of inverter 539 which has its input connected to the output of skew integrator 540. Horizontal skew is vertical skew inverted. Bias 351 provides compensation or correction to the end of field integrator 350 for horizontal edge error while bias 352 provides compensation or correction for vertical skew error.

Briefly, it can be summarized at this time that the presence of a 4 and 8 bit together within a character storage position of a control word starts integrators 310, 325 and 350 and thereafter, the integrators are turned OFF according to the turn off of their coarse and fine control latches. The coarse and fine control latches are reset or switched off by bits spaced within the control word.

The voltages developed and stored by the horizontal, vertical and end of field format integrators 310, 325 and 350 are stored, and then, when in a field search mode, the voltages of the horizontal, vertical and end of field main integrators 625, 650 and 360 are matched to the voltages of the format integrators 310, 325 and 350 respectively. The voltages thus developed by the horizontal and vertical main integrators 625 and 650 are used to deflect the beam whereas the voltage of the end of field main integrator 360 is used to determine when to terminate a character search mode. The deflection of the beam by the integrators 625 and 650 will be described during the description of the beam control circuit 600.

The voltage of the end of field format integrator 350 is transferred to the end of field main integrator 360 through the facility of voltage discriminator 361. Voltage discriminator 361 has one output connected to the D.C. gate of trigger 362 to condition the same when the voltage of integrator 360 is less than that of 350. Trigger 362 thus is set under this condition when logical AND circuit 416 is satisfied because its output is connected to the A.C. set terminal of trigger 362. The ON output of trigger 362 is connected to a positive integrator of integrator 360 and to an input of logical OR circuit 364. A reset input of trigger 362 is connected to an output of discriminator 361 which is present when the voltage of integrator 360 is greater than that of 350. This output is also connected to the D.C. gate of trigger 363. The A.C. set terminal of this trigger is connected to the output of logical AND circuit 416. The reset terminal of trigger 363 is connected to the other output of the voltage discriminator 361. The ON output of trigger 363 is connected to a negative integrator of integrator 360 and to an input of logical OR circuit 364. Hence, triggers 362 and 363 as controlled by discriminator 361 function to have the voltage of integrator 360 match the voltage of integrator 350. The logical OR circuit 364 is connected to an inverter 365 which provides an indication that the voltage of integrator 360 has been matched to that of 350.

Since the horizontal format, the vertical format and the end of field format integrators are substantially the same, only the details of the horizontal format integrator 310 are shown, see FIG. 3. With reference to FIG. 3, the output from the logical OR circuit 313 is connected to the base of a transistor T1. When the coarse latch 315 is SET, the base of transistor T1 is made more negative than the base of transistor T2. Accordingly, transistor T1 is switched OFF and transistor T2 conducts. The amount of current passed from the storage capacitor C via transistor T2 is determined by the voltages across resistors R3 and R4.

The horizontal edge error voltage is applied to resistor R3. The values of resistors R3 and R4 are chosen so as to provide a deflection voltage of 100 mils for each 11.5 microseconds if the horizontal edge error voltage is zero. Of course, if the horizontal edge error voltage is not zero, then the current flowing in transistor T2 will be varied accordingly.

When the coarse latch 315 is turned OFF, the base of transistor T1 is more positive than the base of transistor T2. Thus transistor T1 conducts and transistor T2 switches OFF. With transistor T2 switched OFF, there is no current flowing from capacitor C.

The ON output of fine latch 319 is connected to the base of transistor T3. When the latch 319 is SET, the base of transistor T3 is more negative than the base of transistor T4. Therefore, transistor T3 is OFF and transistor T4 is conducting. The resistor R3 determines the amount of current passing from storage capacitor C through transistor T4. There is no bias circuit in connection with the horizontal fine integrator. Accordingly, the value of resistor R3 is such whereby the output taken from transistor T4 will develop a deflection voltage for deflecting the beam 10 mils for each 11.5 microseconds. When the fine latch 319 is reset, transistor T3 becomes conductive and transistor T4 turns OFF.

The ON output of the reset latch 311 is connected to the base of transistor T5. Transistor T6 is OFF during the time latch 311 is OFF. However, during the time the latch 311 is SET, transistors T5 and T6 will be conductive. Additionally, current will be flowing from transistor T6 to capacitor C. The current passing through transistor T6 is equal to the current passing through resistor R10 minus the current passed by transistor T5 to resistor R5.

The horizontal format integrator 310 also has inputs for developing a horizontal correction voltage for vertical skew. Of course, if there is no vertical skew, then there will be no correction voltage developed by the horizontal format integrator 310. However, if there is vertical skew, then the bias developed by the skew correction voltage will cause the horizontal format integrator 310 to develop a correction voltage. The horizontal format integrator 310 includes transistors T7 and T9 which have their bases connected to the ON output of the vertical coarse latch 327. When the vertical coarse latch 327 is SET, transistors T8 and T10 conduct; however, the currents flowing therefrom are in opposite sense and tend to cancel each other. However, the vertical skew voltage is applied to resistor R13. If the vertical skew voltage is positive in sense, then transistor T8 conducts more current than transistor T10 and current will flow from capacitor C and through transistor T8 whereas if the vertical skew voltage is in a negative sense, transistor T10 conducts more current than transistor T8 and current will flow through transistor T10 to capacitor C. The emitter follower EF transfers the voltage from the capacitor C to the voltage discriminator 605 of the beam control circuitry 600. The emitter follower EF also provides a high impedance path to the capacitor C.

*Mode control*

The mode control circuitry 400 shown in FIGS. 1 and 2 provides signals for indicating when the operation switches from control word mode to field search mode, from field search mode to either error measurement mode or character search mode or scan and count mode, or from any mode into aging or from a character search mode back into a field search mode.

The control word operation mode is always the first mode of operation and this mode is during the period of time that there is a WRT CALL signal from control unit 100. Accordingly, there is no specific circuit within the mode control circuitry 400 for the control word operation mode. At the termination of the control word operation mode, the mode of operation automatically switches to a field search mode. The field search trigger 415 has its D.C. gate connected to the output of a logical OR circuit 413 which has inputs connected to the ON side of trigger TB and the OFF side of trigger TA of the register 240. The A.C. set terminal of trigger 415 is connected to the output of a logical AND circuit 414 which has one input connected to the output of inverter 236 for developing a WRT $\overline{\text{CALL}}$ signal and another input connected to the output of inverter 365 for indicating that the end of the field format integrator voltage is not being transferred to the end of the field main integrator 360. Thus, it is seen that the field search trigger 415 is SET automatically after the control word operation mode terminates.

The ON output of field search trigger 415 is connected to an input of logical AND circuit 416 which also has an input connected to the OFF output of character search trigger 425 and an input connected to the output of inverter 512 which indicates that the horizontal corner integrator 510 and the vertical corner integrator 520 are not being reset. The output of logical AND circuit 416 provides a signal for matching the voltages of the horizontal main integrator 625, the vertical main integrator 650 and the end of field main integrator 360 to the voltages of the horizontal format integrator 310, the vertical format integrator 325 and the end of field format integrator 350 respectively. The specific connections for effecting this matching of voltages has been previously described and no further description will be given. However, when there is a match of voltages between the horizontal main integrator 625 and the horizontal format integrator 310, and the vertical main integrator 650 and the horizontal format integrator 325, two signals are generated via logical AND circuits 607 and 632 and these signals are applied to inputs of logical AND circuit 419 which has its output connected to the reset terminal of field search trigger 415. Hence, field search trigger 415 is reset and the operation can switch to another mode.

The OFF output of field search trigger 415 is connected to A.C. set terminals of the character search trigger 425, the scan and count trigger 427 and the error measurement scan 1 trigger 435. The D.C. gates of these triggers are each connected to a logical AND circuit which functions to decode the operation code character in register 240.

Specifically, logical AND circuit 420 has its output connected to the D.C. gate of character search trigger 425 and has inputs connected to the output of inverter 365, to the ON output of trigger TB and to the OFF output of trigger T8. Hence, if the operation code character in register 240 includes a B bit and not an A bit, then, if the end of field format voltage is not being transferred to the end of field main integrator 360, then when the field search trigger 415 is switched OFF, the character search trigger 425 will be set ON.

With the character search trigger 425 ON, the operation will be in a character search mode. A character search mode can be defined as that mode when characters within a field are being scanned for information. Hence, the ON output of character search trigger 425 is connected to the recognition circuitry in FIG. 1. It should be noted that the recognition circuitry functions to identify the characters being scanned and also has a control output connected to character scan circuitry of FIG. 1, which controls the beam of the cathode ray tube 10 during the character search mode. Since the character recognition circuitry and the control of the beam during a character search mode does not form a part of the invention, the character recognition circuitry and the character scan circuitry are not described.

The ON output of the character search trigger 425 is also connected to control unit 100 to indicate to the same when the operation is in a character search mode. This enables the programmer to set up the program whereby the next field control word can be operated upon while in a character search mode. The voltages for deflecting the beam to the position designated by the next field control word would be developed by the horizontal and vertical format integrator 310 and 325 during the character search mode. These deflection voltages as well as the end of field format voltage would be stored in the horizontal, vertical and end of field format integrators 310, 325 and 350 respectively. The field search trigger 415 will be set and thereafter, when the character search mode terminates as determined by the resetting of the character search trigger 425, then the inputs to logical AND circuit 416 would be satisfied, if not performing a resetting operation of integrators 510 and 520, and the voltages on the horizontal and vertical format integrators 310 and 325 are transferred to the horizontal and vertical main integrators 625 and 650 whereby the beam is directed to the new field. To facilitate this, the OFF output of the character search trigger 425 is connected to the input of logical AND circuit 416. The programmer can also specify that the mode switch from a character search mode to an aging mode. This is possible because the OFF side of the character search trigger 425 is also connected to an input of logical AND circuit 418 which is utilized to develop the aging mode.

A reset terminal of character search trigger 425 is connected to the output of a logical OR circuit 423. The logical OR circuit 423 has one input connected to the output of a voltage discriminator 421. The voltage discriminator 421 has an input connected to the output of the end of field main integrator 360 and an input connected to the output of the horizontal main integrator 625. Thus it is seen that the discriminator 421 functions to compare these two voltages and provide an indication when the end of field has been reached during a character search mode operation. The logical OR circuit 423 also has an input connected to control unit 100 for receiving a programmed end of field signal. Logical OR circuit 423 also has inputs connected to the OFF outputs of latches 613 and 637 which provide indications when the beam is at the extreme left-hand edge and the extreme bottom edge of the scan window. The logical OR circuit 423 also has an input connected to the output of a delay 422. Delay 422 functions to determine whether or not the character search trigger 425 has been ON for too long a period of time. The OFF output of character search trigger 425 is connected to the input of delay 422 and if the character search trigger 425 has been ON for approximately more than 200 milliseconds, the delay develops a signal which resets the character search trigger 425 via the logical OR circuit 423. The logical OR circuit 423 also has an input connected to the output of a logical AND circuit 424 which has an input connected to the OFF output of trigger TA, an input connected to the ON output of trigger TB, and an input connected to control unit 100 for receiving a WRT CALL signal. Hence, if there is a B bit present and not an A bit present in the operation code character, then during a WRT CALL signal, the character search trigger 425 will be reset.

The scan and count trigger 427 is used for diagnostic purposes and for developing a calibration chart for the system by causing the beam to scan a test document. Its D.C. gate is connected to the output of logical AND circuit 426 which has an input connected to the ON outputs of triggers TB and T8 and to the OFF output of trigger T4 of the operation code register 240. The ON output of the scan and count trigger 427 is connected to circuitry which is used for diagnostics and for developing a calibration chart. The OFF output of the scan and count trigger 427 is connected to an input of logical AND circuit 418. The reset terminal of the scan and count trigger 427 is connected to the output of a delay 429 which has its input connected to the output of a logical AND circuit 428. Logical AND circuit 428 has an input connected to the video clipping circuit 60 of FIG. 1 and an input connected to the ON output of the scan and count trigger 427. Hence, the scan and count trigger 427 will be reset after having been set and after the beam has detected black for a predetermined period of time as determined by delay 429.

The error measurement mode usually involves two operations, except for horizontal edge error. Accordingly, to provide for two sequential operations, scan 1 trigger 435 and scan 2 trigger 440 are used for the error operation mode. The D.C. gate of the scan 1 trigger 435 is connected to the output of logical AND circuit 430. Logical AND circuit 430 has an input connected to the OFF output of trigger TA and an input connected to the OFF output of trigger TB. If the operation code character in register 240 does not include an A bit and not a B bit, then the scan 1 trigger 435 will be set when the field search trigger 415 is reset. The ON output of scan 1 trigger 435 provides a signal to the error control circuitry 500 for signalling that certain error measurements are to be made. These error measurements have been described in detail in the general description and will also be described during the description of the error control circuitry 500.

The OFF output of the scan 1 trigger 435 is connected to an input of logical AND circuit 418 and to the A.C. set terminal of scan 2 trigger 440. The scan 1 trigger 435 can be reset by both a D.C. and A.C. signal. The A.C. reset is the normal reset during a mode operation and the D.C. reset is provided from the control unit 100. The A.C. reset terminal of scan 1 trigger 435 is connected to the output of a singleshot multivibrator 433. Essentially, the scan 1 trigger 435 when in an error measurement mode should be reset after the beam has engaged a pre-printed reference line. Hence, the input of the singleshot multivibrator 433 is connected to the output of a logical OR circuit which has an input connected to the video clipping circuitry 60 and an input connected to the output of a delay 439. Thus it is seen that when the beam engages the preprinted line, there is an output from video clipping circuitry 60 for firing a singleshot multivibrator 433 via the logical OR circuit 432. As the singleshot multivibrator 433 fires, the scan 1 trigger 435 is reset. Of course, it is possible that the error could be so great that the beam might not engage the pre-printed line within a predetermined period of time. Under this condition, a signal for firing the singleshot multivibrator 433 comes from delay 439 which has an input connected to the output of a logical AND circuit 437. Logical AND circuit 437 has an input connected to the output of an inverter 436 which has its input connected to the output of singleshot multivibrator 433. Logical AND circuit 437 also has an input connected to the output of a logical OR circuit which has inputs connected to the ON outputs of scan 1 trigger 435 and scan 2 trigger 440.

The OFF output of scan 1 trigger 435 is connected to the A.C. set terminal of scan 2 trigger 440. The D.C. gate of scan 2 trigger 440 is connected to the OFF output of trigger T8 of register 240. By this arrangement, the scan 2 trigger 440 is switched ON as soon as the scan 1 trigger 435 switches OFF if the operation code character in register 240 does not include an 8 bit. The ON output of the scan 2 trigger 440 is also connected to the error control circuit 500 for providing a signal thereto to indicate that certain error measurements are to be made. The details have already been described in the general description and will be further described in the error control description. The scan 2 trigger 440 also has a D.C. and A.C. reset. The D.C. reset is connected to control unit 100 for receiving a D.C. reset signal and the A.C. reset terminal is connected to the output of single shot multivibrator 433. The A.C. resetting of the scan 2 trigger 440 takes place in substantially the same manner as that for scan 1 trigger 435. The OFF output of the scan 2 trigger 440 is connected to an input of logical AND circuit 418.

*Error control*

The error control circuitry 500, FIGS. 1 and 2, includes horizontal corner, vertical corner, horizontal edge, skew, and vertical edge integrators 510, 520, 530, 540 and 545. Each of these integrators are reset under control of an associated latch. Essentially the resetting operation is substantially the same for each integrator, and only the resetting of the horizontal corner integrator 510 will be described. Latch 504 controls the resetting of the horizontal corner integrator 510. The set input of latch 504 is connected to the output of a logical AND circuit 502 which has an input connected to the output of logical AND circuit 220 for receiving a 1st DIGIT signal and an input connected to an output of a logical AND circuit 503 having inputs connected to the OFF outputs of triggers TA, TB, T8 and T4 of register 240. Thus it is seen that a reset control latch, such as latch 504, is set during the time determined by logical AND circuit 220 and as determined by the operation code character in register 240. If the input conditions to logical AND circuit 503 are satisfied, then the latch 504 will be SET when there is an output from logical AND circuit 220.

The ON output of latch 504 is connected to the positive integrator of the horizontal corner integrator 510 and to the input of a logical OR circuit 511 which has its output connected to an inverter 512 to provide an indication of when the integrators 510 and 520 are not being reset. By the connection to integrator 510, when the latch 504 is set, the horizontal corner integrator 510 develops a positive voltage. The output of the horizontal corner integrator is connected to an input of a voltage discriminator 501 which also has an input connected to a plus 4 volts. The voltage discriminator 501 will have an output signal when the voltage of the horizontal corner integrator 510 matches the plus 4 volts. The output of the voltage discriminator 501 is connected to the reset terminal of the latch 504. Thus the latch 504 will be reset when the horizontal corner integrator 510 has reached a plus 4 volts.

Briefly, the vertical corner integrator 520 is reset under control of latch 515 which is set under control of logical AND circuit 502 and reset under control of voltage discriminator 514. The horizontal edge integrator 530 is reset under control of latch 528. Latch 528 is SET under control of logical AND circuit 527 which is rendered operative under control of logical AND circuits 220 and 526. The latch 528 is reset under control of voltage discriminator 531. Similarly, skew integrator 540 is reset under control of latch 535 which in turn is SET under control of a logical AND circuit 534, the same being rendered operative under control of logical AND circuits 220 and 533. The latch 535 is reset under control of voltage discriminator 538. Vertical edge integrator 545 is SET under control of latch 541 which in turn is set under control of logical AND circuit 534. Latch 541 is reset under control of voltage discriminator 544.

Horizontal corner integrator 510 includes two negative integrators which are controlled by a logical AND circuit 505. Logical AND circuit 505 is conditioned by a logical AND circuit 503 and is rendered operative during the period of time that the scan 2 trigger 440 is ON. The logical AND circuit 503, as previously stated, is conditioned by the operation code character in register 240. The vertical corner integrator 520 includes two negative integrators which are rendered operative under control of logical AND circuit 513. Logical AND circuit 513 has one input connected to the output of logical AND circuit 503 and another input connected to the ON output of scan 1 trigger 435.

Thus, it is seen that the horizontal corner and vertical corner integrators 510 and 520 are first reset and then during an error measurement mode, the vertical corner integrator 520 is first rendered operative in response to the scan 1 trigger 435 being ON and assuming that the operation code character satisfies the inputs to logical AND circuit 503. Thereafter, the horizontal corner integrator 510 is rendered operative when the scan 2 trigger 440 is switched on. The outputs of the horizontal and vertical corner integrators 510 and 520 are connected directly to the deflection circuitry 75 of FIG. 1.

The horizontal edge integrator 530 includes one negative integrator controlled by logical AND circuit 529 and another negative integrator controlled by logical AND circuit 532. For a normal length document, only the negative integrator controlled by logical AND circuit 529 is operative. For a short span document, both negative integrators are operative. It should be noted that each operation code character for a short span document error measurement includes a 2 bit. Hence, this 2 bit can be used to signal when the logical AND circuit 532 is to be operative.

Logical AND circuit 529 is conditioned by logical AND circuit 526 which is conditioned by the operation code character in register 240 and is rendered operative during the period of time that the scan 1 trigger 435 is ON. If the operation code character includes a 2 bit, then the logical AND circuit 532 will also be conditioned.

The output of the horizontal edge integrator 530 is connected to inputs of biases 308 and 351 of the digital to analog converter circuitry 300. The output of logical AND circuit 529 is also connected to a negative integrator of the vertical main integrator 650, so as to cause the same to develop a voltage for deflecting the beam to pre-printed line 31 of document 20. During the time the beam is being deflected, the horizontal edge integrator 530 develops and stores a corresponding voltage. If there is no error, then when the beam engages line 31, the horizontal edge integrator 530 would be at zero volts. If the horizontal edge integrator is at other than zero volts at the time the beam engages line 26, then there is horizontal edge error and the voltage of the horizontal edge integrator 530 is used as a bias voltage for correcting the deflection voltage developed by the horizontal and end of field format integrators 310 and 350 respectively.

Skew integrator 540 functions to develop both vertical and horizontal skew. Skew integrator 540 includes a negative integrator controlled by logical AND circuit 536 and a negative integrator controlled by logical AND circuit 537. Logical AND circuit 536 is operative for normal length documents and logical AND circuits 536 and 537 are operative for short span documents. Logical AND circuit 536 is operative during the time the scan 1 trigger 435 is ON provided the operation code character in register 240 satisfies the input conditions to logical AND circuit 533. During the time the skew measurement is being made, the output of logical AND circuit 536 operates a negative integrator of the horizontal main integrator 625 via the logical OR circuit 608. The beam, when the logical AND circuit 536 renders horizontal main integrator 625 operative, moves horizontally to the left until it engages line 26. During this period of time, the negative integrator of skew integrator 540 controlled by the logical AND circuit 536 is operative and this negative voltage is combined with the plus 4 volts reference voltage whereby if there is no skew error, then when the beam engages line 26, the voltage of the skew integrator 540 will be zero. If there is skew error, the voltage of the skew integrator 540 will be something other than zero and this voltage is used as a correction voltage which is applied to biases 309 and 352 and the inversion of this correction voltage as facilitated through inverter 539 is applied to bias 324. Thus horizontal and vertical format integrators 310 and 325 will provide correcting skew deflection voltages.

Vertical edge error voltage is furnished from vertical edge integrator 545. The vertical edge integrator 545 has one negative integrator controlled by logical AND circuit 542 and another negative integrator controlled by logical AND circuit 543. The logical AND circuit 542 is operative for normal length documents while the logical AND circuits 542 and 543 are operative for short span documents. The logical AND circuit 542 will be operative during the time that the scan 2 trigger 440 is ON and provided the operation code character has satisfied the input conditions to logical AND circuit 533.

The vertical edge error measurement is made sequentially after the skew error measurement is made. As it will be seen later herein, after the beam engages line 26 during a skew error measurement, the horizontal main integrator 625 is operative to back the beam off line 26. Hence, during a vertical edge error measurement, the beam is free to be deflected vertically downward toward line 27. The beam is deflected toward line 27 during the period of time that logical AND circuit 542 is operative because its output is connected to a negative integrator of the vertical main integrator 650. When the beam engages line 27 the scan 2 trigger 440 is reset and therefore logical AND circuit 542 is no longer conditioned to operate integrators 545 and 650. During the time that logical AND circuit 542 did operate the negative integrator of vertical main integrator 650, a negative voltage was developed in vertical edge integrator 545 which in combination with the plus 4 volts to which the vertical edge integrator 545 was reset, develops a vertical edge error voltage. If there is no vertical edge error, then the voltage of the vertical edge integrator 545 will be zero at the time the beam engages line 27. The voltage of the vertical edge integrator 545, whatever it may be, is used as a bias voltage and is applied to bias 323 of the vertical format integrator 325. Hence, the deflection voltage developed by the coarse integrator of the vertical format integrator 325 will be corrected as determined by the bias voltage from the vertical edge integrator 545.

*Beam control*

The beam control circuitry of FIGS. 1 and 2 includes horizontal and vertical main integrators 625 and 650. These integrators each include two negative integrators and one positive integrator. The first negative integrator of the horizontal main integrator 625 is operatively controlled by a logical OR circuit 608. The logical OR circuit 608 has inputs connected to the output of logical AND circuit 529, to the output of logical AND circuit 536, into the output of logical AND circuit 418. One of the negative integrators of the vertical main integrator 650 is operably controlled by logical AND circuit 542 which, as it will be recalled, also controls the vertical edge integrator 545.

The other negative integrator of horizontal main integrator 625 and of vertical main integrator 650 are controlled during field search and scan and count modes of operation. Logical AND circuit 615 controls the second negative integrator of horizontal main integrator 625. It has inputs connected to outputs of logical OR circuits 609 and 614. Logical OR circuit 609 has an input connected to one output of a voltage discriminator 605 and an input connected to the output of a logical AND circuit 618 used for a scan and count mode. Logical OR circuit 614 has an input connected to the output of logical AND circuit 618 and an input connected to the output of logical AND circuit 416. The connection between the logical OR circuit 609 and the voltage discriminator 605 has a signal thereon when the voltage of the horizontal main integrator 625 is more positive than the voltage of horizontal format integrator 310. Hence, under these conditions, when either in a field search or scan and count mode, and conditions to logical AND circuits 416 and 618 are satisfied, the second negative integrator of the horizontal main integrator 625 will be rendered operative.

The voltage discriminator 605 also has an output connected to the D.C. gate of trigger 606. The voltage discriminator 605 will provide an output to the D.C. gate of trigger 606 when the voltage of the horizontal main integrator 625 is more negative than the voltage of the horizontal format integrator 310. The A.C. set terminal of trigger 606 is connected to the output of logical AND circuit 416. The ON output of trigger 606 is connected to an input of logical OR circuit 621 which has its output connected to a positive integrator of the main integrator 625. The OFF output of the trigger 606 is connected to an input of a logical AND circuit 607, the same also having an input connected to the output of logical AND circuit 416 and an input connected to the same output of the voltage discriminator 605 as the D.C. gate of trigger 606. Thus, when the second negative integrator of the horizontal main integrator 625 causes the voltage of this integrator to become more negative than the voltage of the horizontal format integrator, the trigger 606 will be conditioned for setting and will be set when the input conditions to logical AND circuit 416 are satisfied. Accordingly, the input conditions to logical AND circuit 615 are no longer satisfied when the trigger 606 is ON; however, the positive integrator of horizontal main integrator 625 will be operative via logical OR circuit 621. When the voltage of the horizontal main integrator 625 becomes more positive than that of the horizontal format integrator 310, the trigger 606 will be switched OFF as a signal is passed from voltage discriminator 605 to the reset terminal of trigger 606. The input conditions to logical AND circuit 607 will be satisfied to provide an output signal indicative that the voltage of the horizontal main integrator 625 has been matched to the voltage of the horizontal format integrator 310.

If the voltage of the horizontal main integrator 625 becomes equal to or greater than either a plus 4 volts or a minus 4 volts, then voltage discriminators 611 and 617 respectively will provide output signals. Voltage discriminators 611 and 617 substantially define the extremities of the horizontal scan. When the horizontal main integrator 625 is at a plus 4 volts, the beam is at the extreme right edge of the face of the cathode ray tube 10. The beam normally sweeps horizontally from the right-hand edge to the left-hand edge. When the beam is at the left-hand edge, the horizontal main integrator 625 will be at approximately minus 4 volts.

Horizontal latch 613 has its SET terminal connected to the output of a logical OR circuit 612 which has an input connected to the output of voltage discriminator 611 and an input connected to the output of logical AND circuit 416. The reset terminal of horizontal latch 613 is connected to the output of voltage discriminator 617. The OFF output of latch 613 is connected to logical OR circuit 621 and to an input of logical OR circuit 423 of the mode control circuit 400. Hence, when the horizontal latch 613 is reset, the beam will be driven from the left-hand edge to the right-hand edge. It should be noted that this action can take place even though there is an output from logical OR circuit 608 for operating the first negative integrator. This is because the positive integrator can override the first negative integrator. Voltage discriminators 611 and 617 are particularly operative when in an aging mode because in this mode the beam sweeps slowly from the right edge to the left edge and then is returned rapidly to the right edge of the face of the cathode ray tube.

The second negative integrator of the vertical main integrator 650 is operated under control of logical AND circuit 641 in substantially the same manner as logical AND circuit 615 controls the second negative integrator of horizontal main integrator 625. During the matching of the voltage of the vertical main integrator 650 to the voltage of the vertical format integrator 325, voltage discriminator 630 and trigger 631 are involved. When the voltage of the vertical main integrator 650 equals the voltage of the vertical format integrator 325, there will be an output from logical AND circuit 632. Voltage discriminators 634 and 642 define the upper and lower limits of the scan window. When the vertical main integrator 650 is approximately plus 4 volts, the beam will be at the upper edge of the scan window of the cathode ray tube 10. As the voltage of the vertical main integrator 650 decreases or becomes more negative than plus 4 volts, the beam is deflected vertically downward. When the beam is at the lower edge of the scan window, the voltage of the vertical main integrator 650 will be approximately minus 4 volts.

Figure 4:
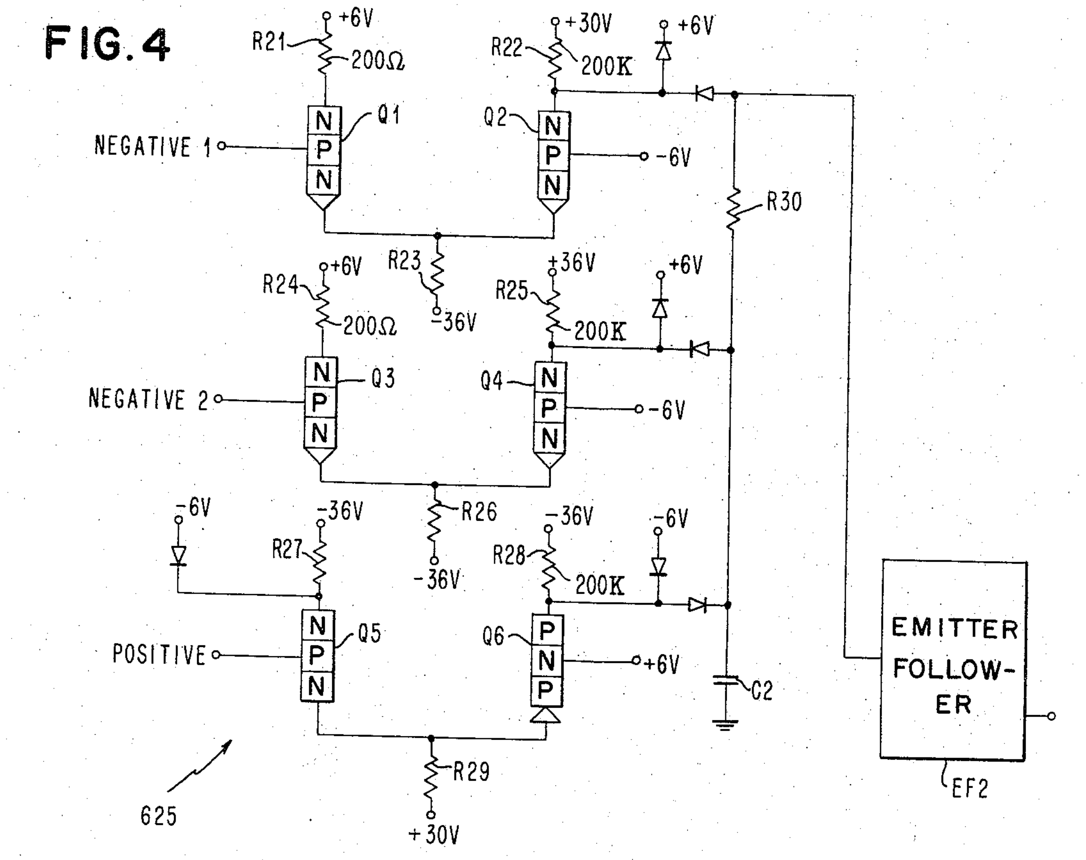
FIG. 4 is a schematic circuit diagram of a typical intergrator for the beam control circuitry shown as a block in FIG. 2.

The horizontal and vertical main integrators 625 and 650 are substantially the same and therefore only the details of the horizontal main integrator 625 are shown in FIG. 4. With reference to FIG. 4, the output of logical OR circuit 608 is connected to the base of transistor Q1 of the first negative integrator of the horizontal main integrator 625. When there is an output signal from logical OR circuit 608, transistor Q1 is turned OFF and transistor Q2 conducts current and the amount of current conducted from capacitor C2 through resistor R30 is determined by resistor R23. Resistor R30 is chosen to be very small so that when transistor Q2 is conducting, there will be only a small voltage drop across resistor R30. The integrator consisting of transistors Q1 and Q2 is a negative integrator and it is used for slowly moving the beam horizontally from right to left as in a skew error measurement.

It will be recalled that when the beam engages preprinted line 26 during a skew error measurement, the scan 1 trigger 435 is reset whereby the logical AND circuit 536 is no longer conditioned and therefore there is no longer an input into logical OR circuit 608. Under these conditions, transistor Q1 conducts and transistor Q2 turns OFF. With transistor Q2 turned OFF, current is no longer conducted through resistor R30. Without a voltage drop across resistor R30, the output voltage at emitter follower EF2 will change to the more positive stored voltage of the capacitor C2. This more positive voltage moves the beam from the reference line 26 to the right a sufficient distance such as a few mils so that the reference line 26 will not be detected when the beam is moved toward reference line 27 during the vertical edge error measurement, the same being made when the scan 2 trigger 440 is ON.

The output of logical AND circuit 615 is connected to the base of transistor Q3. When the inputs to logical AND circuit 615 are satisfied, transistor Q3 is turned OFF and transistor Q4 conducts current from capacitor C2 as determined by resistor R26. Transistors Q3 and Q4 form the second negative integrator of the horizontal main integrator 625. The beam moves from right to left as transistor Q4 conducts. The beam will move at a faster beam speed than when transistor Q2 was conducting. When the inputs to logical AND circuit 615 are no longer satisfied, transistor Q4 turns OFF and transistor Q3 conducts.

The positive integrator of horizontal main integrator 625 consists of transistors Q5 and Q6. The base of transistor Q5 is connected to the output of logical OR circuit 621. When there is an output from logical OR circuit 621, the emitter of transistor Q5 becomes more negative and therefore transistor Q5 conducts less current from resistor R29. The voltage at the emitter of transistor Q6 becomes more positive turning transistor Q6 ON. The amount of current conducted by transistor Q6 to the capacitor C2 is controlled by the resistors R27 and R29. When transistor Q6 is conducting, the beam is deflected horizontally from left to right. If there is no longer an output from logical OR circuit 621, the emitter of transistor Q5 becomes more positive thereby conducting more current through resistor R29. This in turn lowers the voltage at the collector of transistor Q5 sufficiently to turn OFF transistor Q6.

Figure 5:
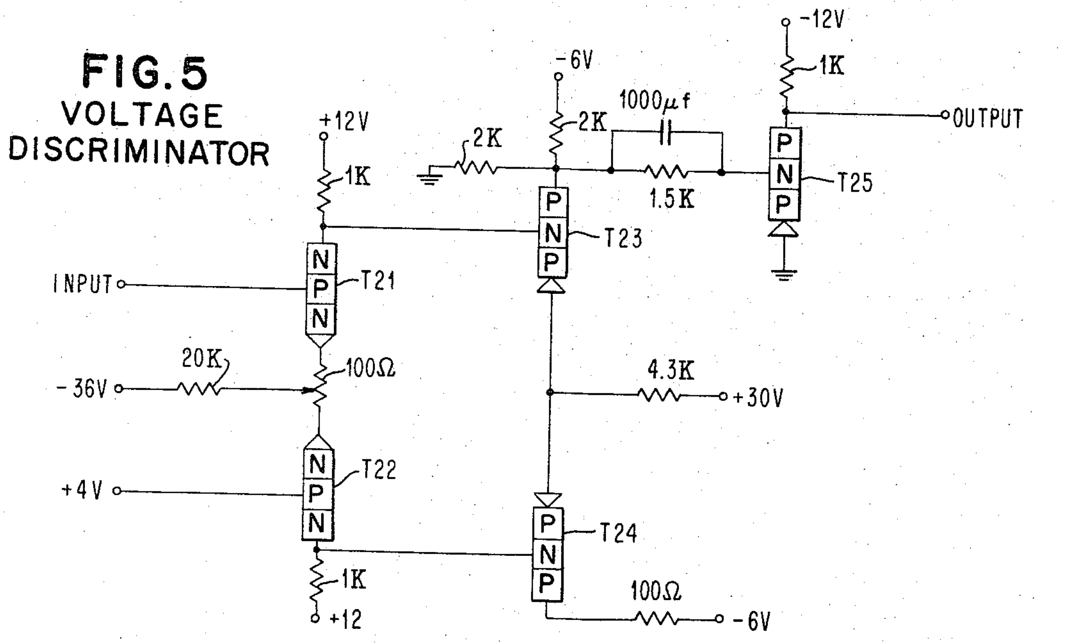
FIG. 5 is a schematic circuit diagram of a typical voltage discriminator shown as a block in FIG. 2.

The voltage discriminators shown throughout FIG. 2 are substantially the same and a typical voltage discriminator is shown in FIG. 5. The plus 4 volts reference voltage is applied to the base of transistor T22. The other input to the voltage discriminator such as the input from the horizontal main integrator 625 is applied to the base of transistor T21. The output of the voltage discriminator is taken from the collector of transistor T25. Essentially, the voltage discriminator has an output when the variable input applied to the base of transistor T21 exceeds the predetermined level or plus 4 volts applied to the base of transistor T22. When the input signal to the base of transistor T21 is more negative than the input to the base of transistor T22, transistor T21 is cut off and transistor T22 is conducting. With transistor T21 OFF, transistor T23 is held OFF and transistor T24 is ON because its base will be more negative than the base of transistor T23. Transistor T25 will be ON because its base at this time will be more negative than its emitter. With transistor T25 ON, the output will be at ground potential.

When the input to the base of transistor T21 is more positive than the input to the base of transistor T22, transistor T21 will begin to conduct and transistor T22 turns OFF. With transistor T21 conducting, transistor T23 conducts because its base will be more negative than the base of transistor T24. With transistor T23 conducting, the base of transistor T25 becomes more positive than its emitter and therefore transistor T25 turns OFF and the output swings to minus 12 volts.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Apparatus for controlling the beam deflection circuitry of a cathode ray tube comprising:

means including selectively operable integrators for developing horizontal and vertical deflection voltages according to selective variable time bases, control means for selectively controlling said integrators for variable lengths of time, said control means thereby developing deflection voltages of predetermined magnitudes, means for selectively applying said vertical and horizontal deflection voltages to said deflection circuitry of said cathode ray tube.

2. In a flying spot scanning system:

a control unit for providing control signals, coded operation code characters, and control bits at predetermined times;

digital to analog conversion means connected to said control unit to be rendered operable by said control bits to develop horizontal and vertical deflection voltages;

storage means for storing said horizontal and vertical deflection voltages;

means connecting said storage means to said digital to analog conversion means;

beam control means for controlling the horizontal and vertical deflection of the beam of the flying spot scanner; and mode control means operably connected to said control unit and connected to said storage means and said beam control means to effect the transfer of said stored horizontal and vertical deflection voltages to said beam control means upon being rendered operable by said control unit.

3. The scanning system of claim 2 wherein said storage means stores said horizontal and vertical deflection voltages as the same are being developed.

4. The scanning system of claim 2 further comprising:

an operation code register connected to said control unit to receive operation code characters therefrom, said register being connected to said mode control means to further control the same.

5. The scanning system of claim 4 further comprising:

error measurement control means connected to said operation code register and to said mode control means to be resettable to a predetermined voltage under control thereof and operably controlled by said mode control means to develop signals for controlling said beam control means whereby the same causes the beam to be deflected until the beam engages pre-printed marks upon a document, said error measurement control means develops a voltage corresponding to the voltage for deflecting the beam to said pre-printed mark to modify the reset voltage; and means for applying the modified reset voltage to bias said digital to analog conversion means.

6. Apparatus for selectively positioning the beam of a flying spot scanner having a beam home position to relative predetermined field positions upon a document, said document having a coordinate reference point as a document home position comprising:

horizontal and vertical beam deflection circuitry;

means for developing horizontal and vertical voltages for aligning said beam home position of said flying spot scanner with said home position of said document, said means being connected to said horizontal and vertical beam deflection circuitry;

means for developing horizontal and vertical deflection voltages; and means for selectively connecting said deflection voltage developing means to said deflection circuitry whereby said beam is deflected to predetermined document field positions.

7. The apparatus of claim 6 further comprising:

means for developing voltages corresponding to horizontal and vertical document skew and edge errors; and means for applying said error voltages as biasing voltages to said means for developing horizontal and vertical deflection voltages.

8. Apparatus for controlling the beam of a cathode ray tube comprising:

a control unit for providing control signals at predetermined times;

mode control means for providing field search mode signals and operatively connected under control of said control unit;

beam control means adapted to provide horizontal and vertical deflection voltages to said cathode ray tube;

voltage developing means; means connecting said voltage developing means to said control unit; means operative under control of said mode control means for connecting said voltage developing means to said beam control means whereby in response to a field search mode signal, the horizontal and vertical deflection voltages of said beam control means are matched to said developed horizontal and vertical deflection voltages.

9. The apparatus of claim 8 further comprising:
means for developing an end of field voltage in response to signals from said control unit; and
means for comparing said end of field voltage with said horizontal deflection voltage of said beam control means and connected to said mode control means to switch the same out of a field search mode upon the voltages being equal.

10. Apparatus for controlling the beam deflection circuitry of a cathode ray tube comprising:
beam control means connected to said deflection circuitry to provide horizontal and vertical deflection voltage thereto;
control means for supplying a plurality of control signals occurring at predetermined times;
mode control means for providing a plurality of mode signals, said mode control means being connected to said control means to be switched to a first mode thereby;
voltage developing means connected to said control means to develop horizontal and vertical deflection voltages and an end of field voltage in response to control signals therefrom;
means operably controlled by said mode control means when the same is switched to said first mode to connect said voltage developing means to said beam control means to enable said beam control means to apply horizontal and vertical deflection voltages from said voltage developing means and operable upon said beam control means acquiring said horizontal and vertical deflection voltages to switch said mode control means to a second mode; and
error control means for developing error correcting voltages for said beam control means and said voltage developing means, said error control means being connected to said beam control means and said voltage developing means and connected to said mode control means and said control means to be rendered operable when said mode control means switches to said second mode and said control means provides one of said plurality of control signals.

11. The apparatus of claim 10 further comprising:
means connected to said error control means and to said mode control means to switch said mode control means to a third mode in response to completion of the development of said error correction voltages.

12. The apparatus of claim 11 further comprising:
means connected to said mode control means and said beam control means and operable when said mode control means is in said third mode to cause said beam control means to develop horizontal and vertical aging deflection voltages.

13. The apparatus of claim 10 further comprising:
means connected to said control means and to said mode control means and rendered operable upon said beam control means acquiring said horizontal and vertical deflection voltages and said control means provides another one of said plurality of control signals to switch said mode control means to a fourth mode.

14. The apparatus of claim 13 further comprising:
comparing means connected to said voltage developing means and said beam control means to compare said end of field voltage with said horizontal deflection voltage and develop a signal in response to their being equal, said comparing means being connected to said mode control means to switch the same out of said fourth mode upon the equal signal being generated.

15. Apparatus for developing horizontal and vertical correction voltages which, when applied to beam deflection circuits of a cathode ray tube having a beam home position will align the beam home position with a home position on a document having a home position and located in a scanning position relative to said cathode ray tube, said document having a set of pre-printed vertical and horizontal reference marks comprising:
means for first deflecting said beam horizontally from said home position to said vertical pre-printed mark and second for deflecting said beam vertically from the same horizontal level as said home position to said horizontal reference mark;
error determining means operable to determine vertical and horizontal deflection errors in deflecting said beam to said horizontal and vertical pre-printed marks; and,
error correction signal generating means operable to develop vertical and horizontal error correction voltages of magnitudes corresponding to the magnitudes of the said vertical and horizontal deflection errors.

16. Apparatus for selectively positioning the beam of a flying spot scanner having a beam home position to random scannable fields on a document, said document having a coordinate reference point as a home position comprising:
scanner beam positioning means for developing predetermining horizontal and vertical scanner deflection voltages to position the beam of said flying spot scanner to predetermined field coordinate positions relative to said document;
means for making error measurements between said beam home position and said document home position; and,
means for applying said error measurements to said scanner beam positioning means.

17. The apparatus of claim 15 further comprising means for generating an error control signal upon said beam failing to encounter said vertical and horizontal preprinted marks within a predetermined period of time as said beam is deflected to said vertical and horizontal preprinted marks.

18. In a character recognition machine:
a cathode ray tube scanner;
beam deflection means selectively operable in response to beam deflection signals to vertically and horizontally deflect the beam of said cathode ray tube scanner;
mode control means selectively operable in a plurality of modes to generate field positioning beam deflection signals, aging beam deflection signals and character reading beam deflection signals; and,
control means for providing signals to said mode control means to switch the same from one mode to another.

19. In a character recognition machine:
a cathode ray tube scanner;
means for operating said scanner in field positioning and character reading modes in response to field positioning and character reading signals; and,
means for developing field positioning and character reading signals, said means being operable to develop said field positioning signals while said scanner is operating in said character reading mode.

20. In a character recognition machine:
a cathode ray tube scanner;
means for operating said scanner in field positioning and character reading modes in response to field positioning and character reading signals;
means for providing field positioning and character reading signals;
means for providing an end-of-field indication in terms of scanner position; and,
means operable to generate an end-of-field control signal when said scanner is at a position corresponding to said end-of-field indication.

21. Character recognition apparatus having selectively operable means for generating character scan deflection voltages, the improvement comprising:

a cathode ray tube scanner including a cathode ray tube and beam deflection means responsive to horizontal and vertical deflection voltages to move the beam relative to the face of the cathode ray tube;

means for developing horizontal and vertical beam field positioning deflection voltages;

selectively operable means for applying said field positioning deflection voltages to said beam deflection means;

means for providing an end-of-field voltage; and, means for determining when said beam deflection means has been responsive to a deflection voltage equal to said end-of-field voltage.

References Cited

UNITED STATES PATENTS

| | | | |
|---|---|---|---|
| 2,834,005 | 5/1958 | Ketchledge | 340—173 |
| 2,851,525 | 9/1958 | Kihn | 178—7.7 |

OTHER REFERENCES

A.R.R.L., Radio Amateurs Handbook, page 23.

Boekhorst and Stolk; Television Deflection Systems, pages 95, 104, 105.

JOHN W. CALDWELL, *Primary Examiner.*

DAVID G. REDINBAUGH, *Examiner.*

R. K. ECKERT, *Assistant Examiner.*